(12) United States Patent
Okamoto et al.

(10) Patent No.: US 6,542,840 B2
(45) Date of Patent: Apr. 1, 2003

(54) CALIBRATION SYSTEM, TARGET APPARATUS AND CALIBRATION METHOD

(75) Inventors: Shusaku Okamoto, Osaka (JP); Masamichi Nakagawa, Osaka (JP); Atsushi Morimura, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 78 days.

(21) Appl. No.: 09/770,038

(22) Filed: Jan. 25, 2001

(65) Prior Publication Data

US 2001/0012985 A1 Aug. 9, 2001

(30) Foreign Application Priority Data

Jan. 27, 2000 (JP) ........................................ 2000-018409

(51) Int. Cl.[7] .................................................. G01S 1/70
(52) U.S. Cl. ........................................ 702/94; 702/152
(58) Field of Search ............................. 33/700; 73/1.01, 73/1.75, 1.79, 514; 224/908; 356/3; 396/419; 702/94, 95, 105, 150, 152, 153

(56) References Cited

FOREIGN PATENT DOCUMENTS

| EP | 0 328 687 A1 | 8/1989 |
|---|---|---|
| JP | 63301690 A | 12/1988 |
| JP | 63304791 A | 12/1988 |
| JP | 3-99952 | 4/1991 |
| JP | 03092712 A | 4/1991 |
| JP | 7-27408 | 3/1995 |
| JP | 7-90494 | 10/1995 |
| JP | 8-500460 | 1/1996 |
| JP | 08285534 A | 11/1996 |
| JP | 10341458 A | 12/1998 |
| JP | 11033962 A | 2/1999 |
| JP | 11134480 A | 5/1999 |
| JP | 3106547 | 9/2000 |
| JP | 2001-506369 | 5/2001 |
| WO | WO 00/07373 | 2/2000 |

OTHER PUBLICATIONS

Asada, Naoki "Camera Calibration" *Computer Vision*, Takashi Matsuyama et al, 2nd ed., Tokyo: Shin Gijutsu Communications, 1999 Chapter 3, pp. 37–52 and a partial English translation thereof.

*Primary Examiner*—John Barlow
*Assistant Examiner*—Douglas N. Washburn
(74) *Attorney, Agent, or Firm*—Harness, Dickey & Pierce, PLC

(57) ABSTRACT

Simple calibration of a camera mounted on a mobile object is implemented. With a joint means, a target apparatus for calibration is physically fixed to the mobile object having a camera mounted thereon. The positional relation between the vehicle and the target apparatus is finely adjusted while visually confirming a target point on the vehicle through a scope means.

7 Claims, 21 Drawing Sheets

<Fixed>  <Positioned on the Ground>

FIG. 19
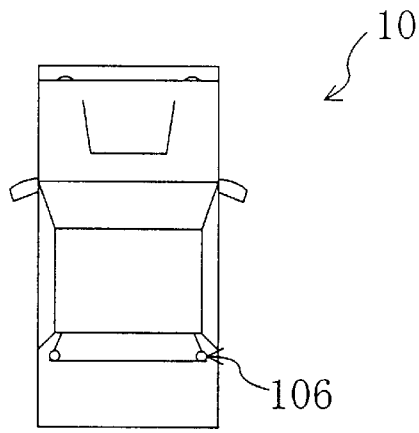
Coordinates in Coordinate System 1: (X1, Y1, Z1)
Coordinates in Coordinate System 2: (X2, Y2, Z2)
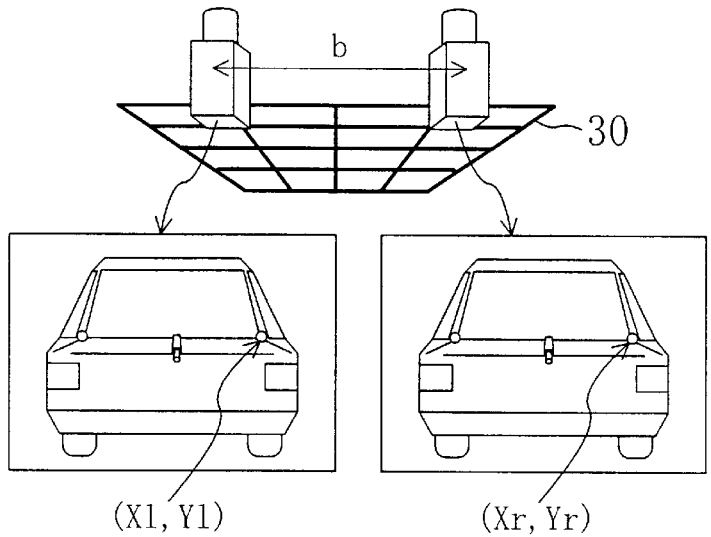

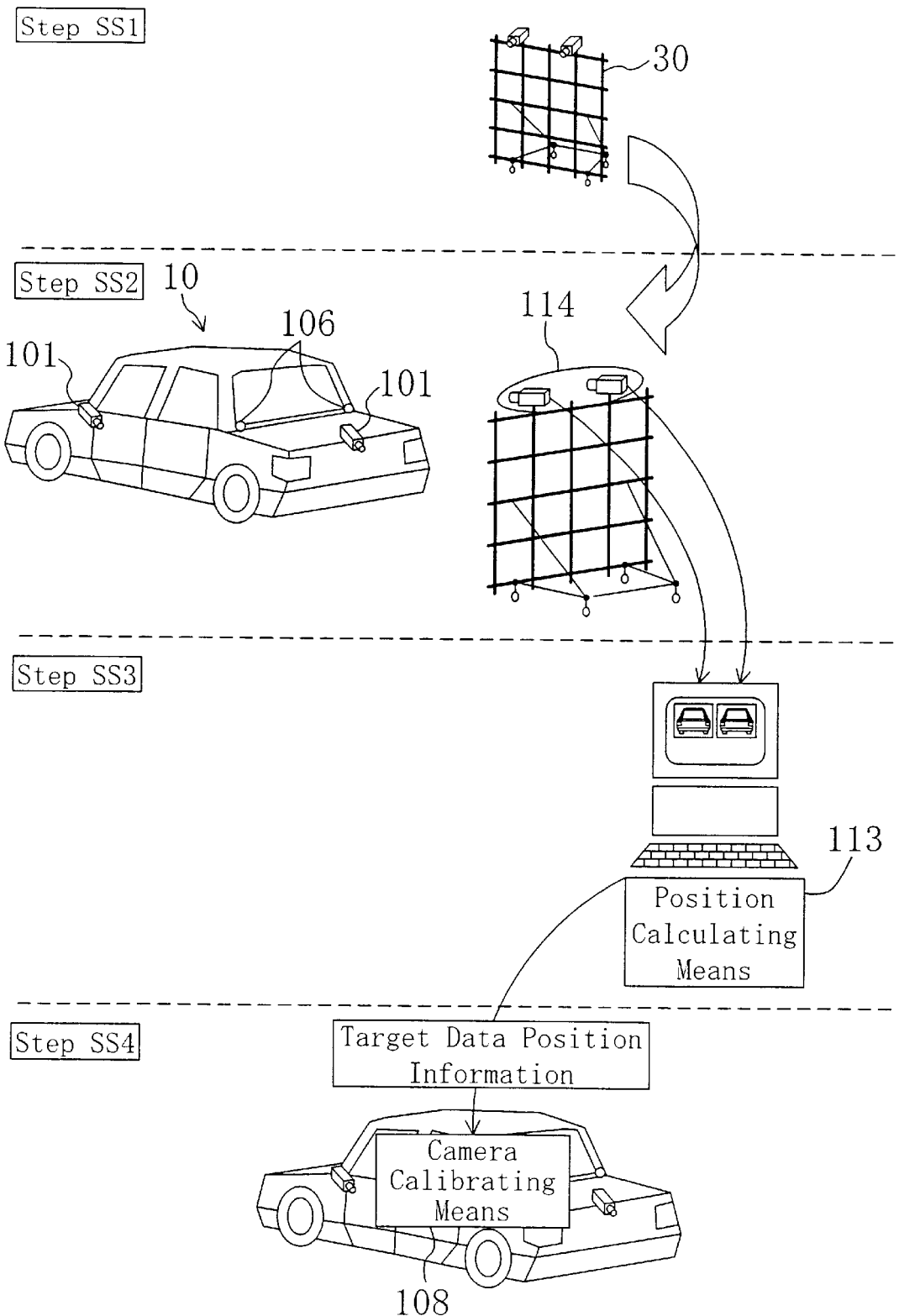

CALIBRATION SYSTEM, TARGET APPARATUS AND CALIBRATION METHOD

BACKGROUND OF THE INVENTION

The present invention relates to calibration for calculating the position and/or orientation of a camera. More specifically, the present invention relates to the technology of calibrating in a simple manner a camera mounted on a mobile object with high precision.

Conventionally, a system is known that monitors the surroundings of a vehicle by means of a camera mounted thereon. In such a monitoring system, a plurality of cameras are generally mounted on the vehicle so as to display a captured image on a monitor mounted inside the vehicle.

FIG. 23 is a block diagram showing the structure of a conventional vehicle surrounding monitoring system (Japanese Laid-Open Publication No. 3-99952). In FIG. 23, an image converting section 1202 receives the respective images from a plurality of cameras 1201 mounted on the vehicle to produce a synthesized image as viewed from a virtual view point by perspective transformation. An image display portion 1203 displays the synthesized image on a TV monitor 1204 installed at, e.g., the driver's seat. When the virtual view point is oriented downward at the upper central position of the vehicle, the driver can instantly see the situations at and around the vehicle from the TV monitor 1204, resulting in improved safety of the driving.

(Problems)

The aforementioned monitoring system joins a plurality of camera images into a single image. In order to avoid any displacement at each boundary between the joined images, it is necessary to calculate in advance the orientation and position of each camera accurately. This calculation is referred to as camera calibration.

For example, in a known calibration method, feature points each having a known coordinate position in a prescribed coordinate system are captured with respective cameras in order to produce a set of data having the coordinates of each feature point on the camera image mapped with its actual spatial coordinates, i.e., calibration data. Calibration is conducted using the calibration data thus produced. Since this calibration method is described in detail in, e.g., Matsuyama et al., "Computer Vision: Gijyutsu Hyouron To Syourai Tenbou (Technical Review and Future Outlook)" (Shin-gijyutsu Communications, pp. 37–53, June 1998), description thereof is herein omitted.

For example, the following technologies are known regarding camera calibration: technology of calibrating a visual sensor system of a transfer line by means of a special jig (disclosed in Japanese Publication for Opposition No. 7-90494); and technology of obtaining an installation error of fixed three-dimensional visual means in a robot coordinate system in a robot handling apparatus (disclosed in Japanese Publication for Opposition No. 7-27408). However, no effective calibration technology has been established for the cameras mounted on mobile objects such as vehicles.

Moreover, in order to calibrate the cameras having a wide monitoring range such as those for vehicle monitoring, feature points must be widely distributed throughout the camera's monitoring range. This requirement may be satisfied by installation of huge equipment having such feature points. However, this is not preferable since a large site and extremely high costs are required. Moreover, if such equipment is installed at a certain location, a vehicle must be moved all the way to the location for camera calibration, resulting in significant inconvenience. Since it is expected that the vehicle surrounding monitoring systems be widely used in the future, development of a simple camera calibration method is of urgent necessity in view to exchange or addition of the camera and a possibility of frequent positional displacement of the camera due to a traffic accident or vehicle running.

SUMMARY OF THE INVENTION

It is an object of the present invention to enable simple high-precision calibration of a camera mounted on a mobile object.

More specifically, a calibration system according to the present invention includes: a mobile object having a camera mounted thereon; a target apparatus for calibrating the camera; and a positioning means provided to at least one of the mobile object ant the target apparatus for fixing a positional relation between the mobile object and the target apparatus to a prescribed relation.

According to the present invention, the positional relation between the mobile object and the target apparatus can be fixed to the prescribed relation by the positioning means. As a result, the mobile object need no longer be accurately positioned for camera calibration. Accordingly, calibration of the camera mounted on the mobile object is simplified.

In the calibration system of the present invention, the positioning means has a joint means for physically fixing the target apparatus to the mobile object.

In the calibration system of the present invention, the positioning means has a scope means provided to one of the mobile object and the target apparatus for positioning the target apparatus with reference to a target point located on the other.

In the calibration system of the present invention, the target apparatus has a feature point capable of emitting light under external control, and the mobile object includes a control means for controlling the light emission of the feature point of the target apparatus.

According to the present invention, a calibration system includes: a mobile object having a camera mounted thereon; a target apparatus for calibrating the camera; and a positional-relation estimating means provided to at least one of the mobile object ant the target apparatus for obtaining a positional relation between the mobile object and the target apparatus.

According to the present invention, the positional relation between the mobile object and the target apparatus is obtained by the positional-relation estimating means. As a result, the mobile object need no longer be accurately positioned for camera calibration. Accordingly, calibration of the camera mounted on the mobile object is simplified.

In the calibration system of the present invention, the positional-relation estimating means has a target data obtaining means provided to one of the mobile object and the target apparatus for obtaining a coordinate value of a target point located on the other in a coordinate system in the one with reference to the target point.

A target apparatus for calibrating a camera mounted on a mobile object according to the present invention includes a positioning means for fixing a positional relation between the mobile object and the target apparatus to a prescribed relation.

A target apparatus for calibrating a camera mounted on a mobile object according to the present invention includes a positional-relation estimating means for obtaining a positional relation between the mobile object and the target apparatus.

A method for calibrating a camera mounted on a mobile object according to the present invention includes the steps of: preparing a target apparatus for calibration around the mobile object; fixing a position of the target apparatus such that the target apparatus has a prescribed positional relation with the mobile object, by using a positioning means provided to at least one of the mobile object and the target apparatus; and capturing a feature point of the target apparatus with the camera, wherein the camera is calibrated based on a relation between image coordinates of the feature point and real-world coordinates thereof.

A method for calibrating a camera mounted on a mobile object according to the present invention includes the steps of: preparing a target apparatus for calibration around the mobile object; obtaining a positional relation between the target apparatus and the mobile object by using a positional-relation estimating means provided to at least one of the mobile object and the target apparatus; and capturing a feature point of the target apparatus with the camera, wherein the camera is calibrated based on image coordinates of the feature point, real-world coordinates of the feature point based on the target apparatus, and the obtained positional relation between the target apparatus and the mobile object.

BRIEF DESCRIPTION OF THE DRAWINGS

FIG. 19 is a diagram illustrating calculation of the coordinate value of the feature point.

FIG. 21 is a diagram showing the overview of the procedures of the case where the present invention is applied to services.

DETAILED DESCRIPTION OF THE INVENTION

Figure 1A:
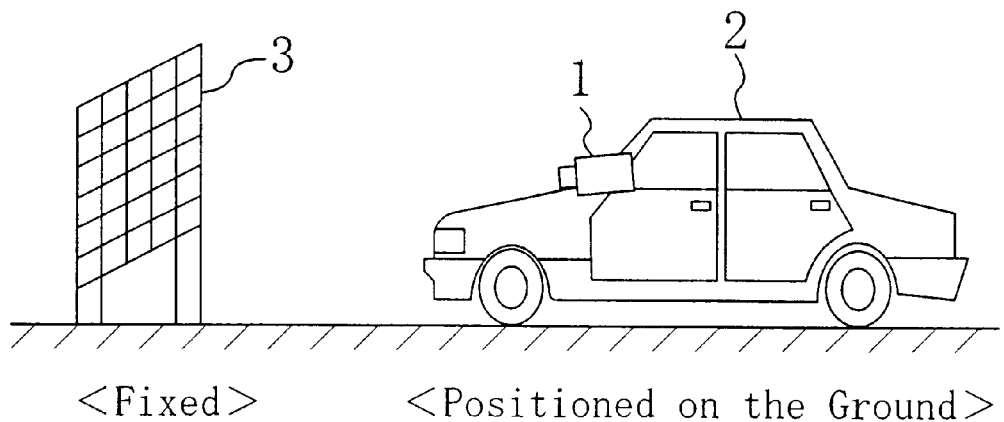
FIGS. 1A and 1B are diagrams conceptually showing a technical idea of the present invention.
Figure 1B:
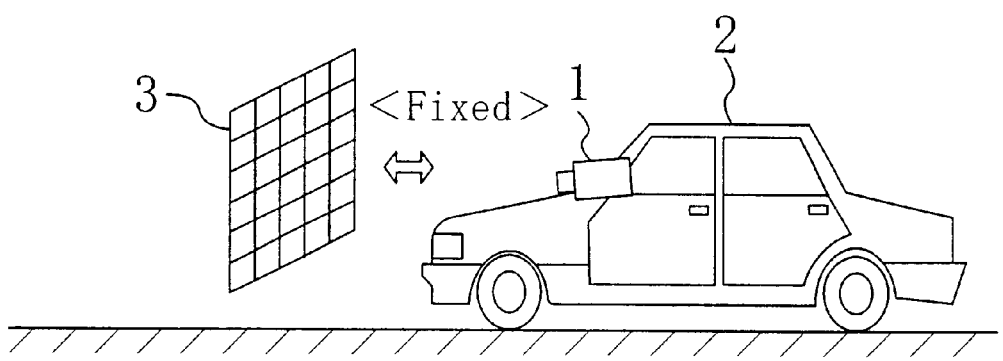

FIGS. 1A and 1B are diagrams conceptually showing a technical idea of the present invention. In FIG. 1A, a vehicle 2 having a camera 1 mounted thereon is positioned on the ground, and a target apparatus 3 for calibration is fixed to the ground. In other words, the positional relation between the vehicle 2 and the target apparatus 3 is set by means of the ground.

In the case of FIG. 1A, the vehicle 2 must be positioned on the ground with precision on the order of several millimeters in order to realize high-precision calibration, but in practice, this is extremely difficult. Moreover, the vehicle 2 must be moved to the installation location of the target apparatus 3 upon every calibration.

Then, in the present invention, the target apparatus 3 is directly fixed to the vehicle 2 as shown in FIG. 1B, rather than by means of the ground. As a result, the vehicle 2 need no longer be positioned with precision on the order of several millimeters, nor is the location for conducting calibration limited, thereby allowing implementation of simple calibration.

Hereinafter, embodiments of the present invention will be described with reference to the accompanying drawings.

(Embodiment 1)

Figure 2A:
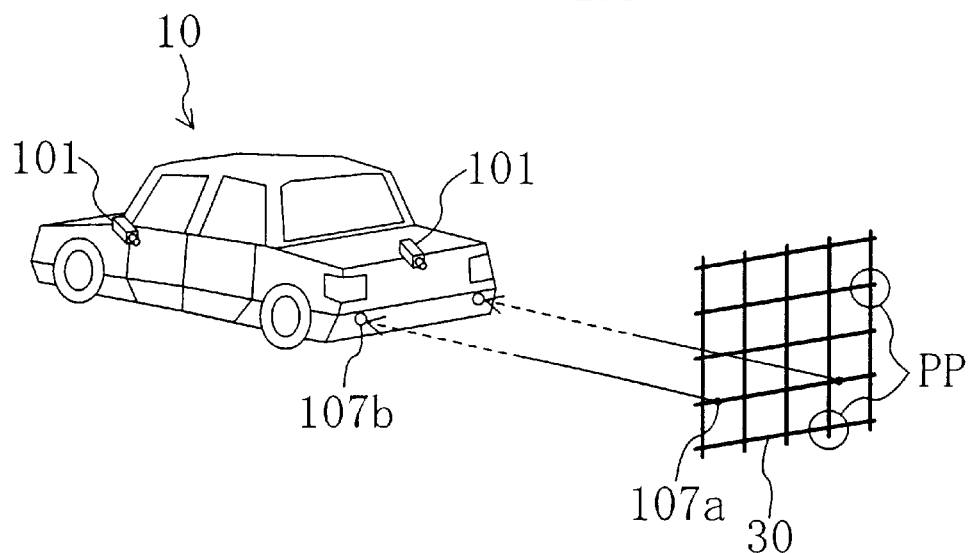
FIGS. 2A and 2B are diagrams showing the structure of a calibration system according to a first embodiment of the present invention.
Figure 2B:
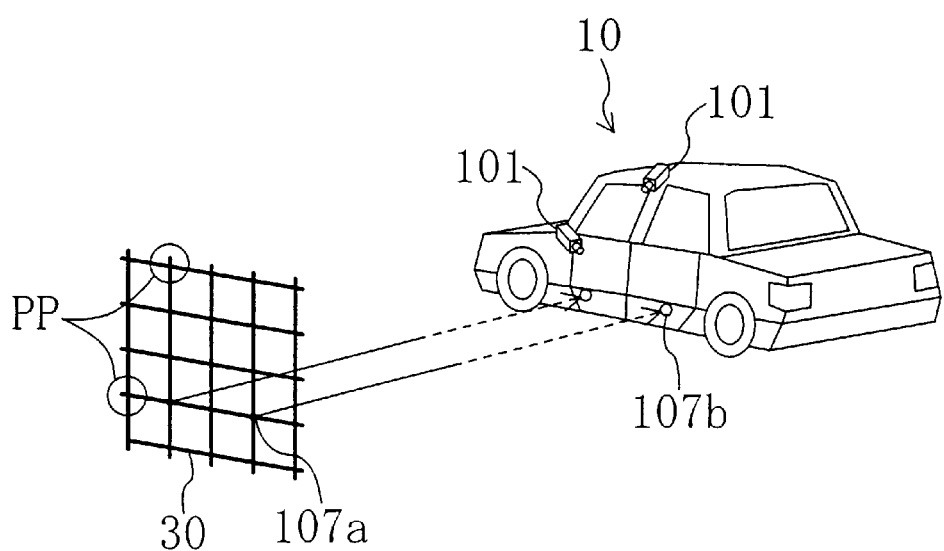

FIGS. 2A and 2B are diagrams showing the structure of a calibration system according to the first embodiment of the present invention. In FIGS. 2A and 2B, a vehicle 10 as a mobile object having cameras 101 mounted thereon and a target apparatus 30 for calibrating the cameras 101 are physically fixed to each other with joint means 107a, 107b serving as positioning means. FIG. 2A shows the target apparatus 30 being joined from the rear of the vehicle 10, and FIG. 2B shows the target apparatus 30 being joined from the side of the vehicle 10. Specifically, the joint means 107a at the target apparatus 30 are, e.g., threaded projections, and the joint means 107b at the vehicle 10 are, e.g., tapped holes.

The target apparatus 30 has feature points PP that are required to adjust the cameras 101. In FIGS. 2A and 2B, the feature points PP are provided by the intersections of a lattice structure formed by rods of plastic, wood or other materials. However, the feature points PP may be provided in any form, like being directly drawn on a plate-like material, as long as their positions can be specified.

Calibration of the cameras 101 is conducted with the vehicle 10 and the target apparatus 30 being fixedly joined by the joint means 107a, 107b. Moreover, according to the structure of FIGS. 2A and 2B, independent target apparatuses 30 need not be separately produced in order to calibrate the cameras 101 mounted at a plurality of positions. In other words, the same target apparatus 30 can be used in common.

Note that the joint means for physically fixing the vehicle 10 and the target apparatus 30 to each other are not specifically limited to the combination of threaded projection and tapped hole, and various structures are possible. For example, a hole may be formed in advance in the vehicle 10 as a joint means so as to receive a rod-like joint means provided at the target apparatus 30.

Figure 3:
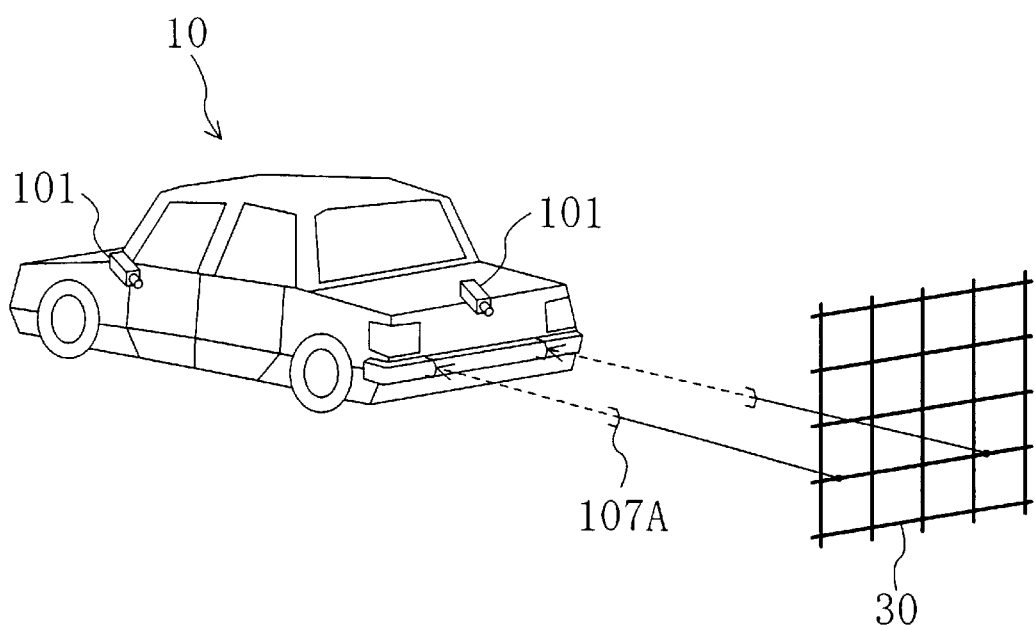
FIG. 3 is a diagram showing another example of the structure of joint means.

Alternatively, a fixing member as a joint means may be provided only on the target apparatus 30. In this case, the target apparatus 30 is fixed to the vehicle 10 by, e.g., fitting the fixing member into a portion of the vehicle 10. FIG. 3 is a diagram showing an example of the structure using such fixing members. In the example of FIG. 3, pinching members are used as joint means 107A. The target apparatus 30 is physically fixed to the vehicle 10 by pinching the rear bumper of the vehicle 10 with the pinching members. In this case, a special mechanism need not be provided on the vehicle 10, whereby external appearance of the vehicle 10 is not degraded. Note that marking the pinch positions in advance simplifies the operation of fixing the target apparatus 30. It should be appreciated that the fixing member(s) may be provided at the vehicle 10 in order to fix the target apparatus 30.

Figure 4:
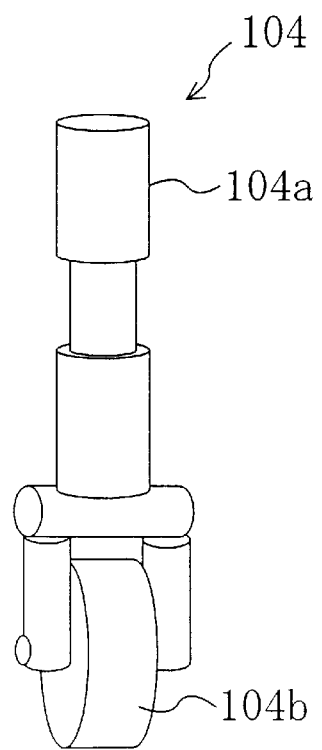
FIG. 4 is a diagram showing an example of the structure of a positional adjustment means.

Provision of a positional adjustment means 104 as shown in FIG. 4 to the target apparatus 30 facilitates positional adjustment of the target apparatus 30 with respect to the vehicle 10. The positional adjustment means 104 as shown in FIG. 4 includes a mechanism 104a capable of being finely adjusted in the vertical direction with a screw, and a mechanism 104b capable of being adjusted in position in the four directions (front, rear, right and left) with a wheel. Note that, in order to prevent any positional displacement of the target apparatus 30 during calibration, the positional adjustment means 104 preferably has a fixing member for fixing the movement of the mechanisms 104a, 104b. However, this fixing member is merely required from the standpoint of preventing the positional displacement of the target apparatus 30 with respect to the ground. In principle, calibration of the cameras 101 can be carried out as long as the joint means can maintain a constant positional relation between the vehicle 10 and the target apparatus 30.

Figure 5:
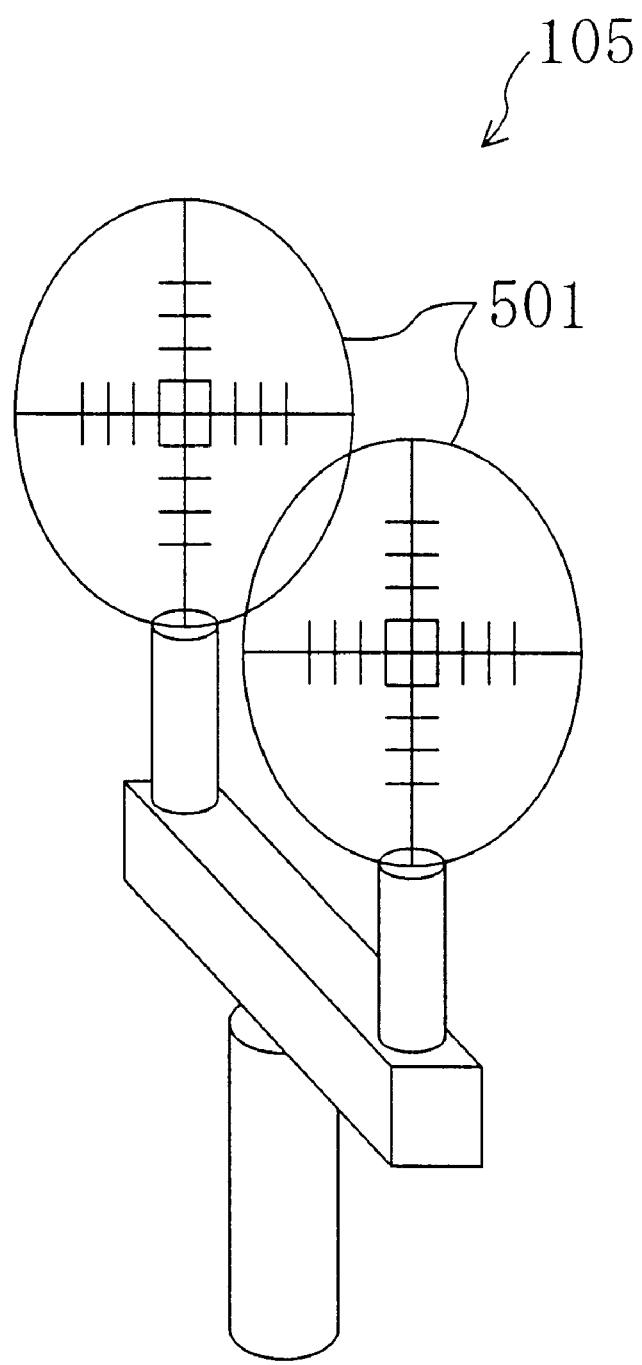
FIG. 5 is a diagram showing an example of the structure of a scope means.

Moreover, a scope means 105 as shown in FIG. 5 is used in the present embodiment. The scope means 105 enables the operator to see if the vehicle 10 and the target apparatus 30 have a prescribed positional relation or not. In the example of FIG. 5, two vertically and horizontally graduated circular glasses 501 are mounted at a prescribed distance from each other. Provision of the scope means 105 on the target apparatus 30 facilitates positional adjustment of the target apparatus 30.

Figure 6:
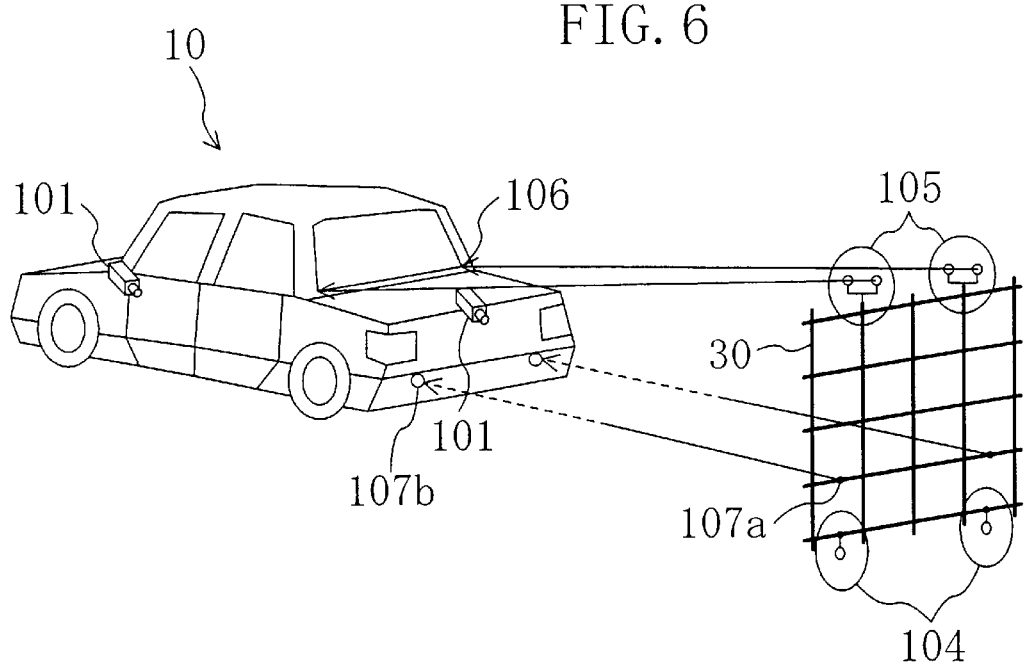
FIG. 6 is a diagram showing another example of the structure of the calibration system according to the first embodiment of the present invention, in which scope means and positional adjustment means are provided.

FIG. 6 is a diagram showing an example of the structure of a calibration system using the target apparatus 30 having the positional adjustment means 104 of FIG. 4 and the scope means 105 of FIG. 5. The positional adjustment means 104, scope means 105 and joint means 107a, 107b form a positioning means according to the present invention. As shown in FIG. 6, the position of the target apparatus 30 can be easily adjusted by visually confirming target points 106 on the vehicle 10 through the respective scope means 105 of the target apparatus 30. The target point 106 may be provided in any form as long as it can be easily confirmed through the scope means 105 whether or not there is any positional displacement between the vehicle 10 and the target apparatus 30. Specifically, a light emitting diode (LED) may be disposed at the position of the target point 106 so that it is turned on or rendered blinking. Alternatively, merely a specific portion of the vehicle, e.g., a corner of the rear window, may be defined as the target point 106. The scope means 105 may have a function as a lens so that the target position 106 can be confirmed even from a remote location.

Figure 7:
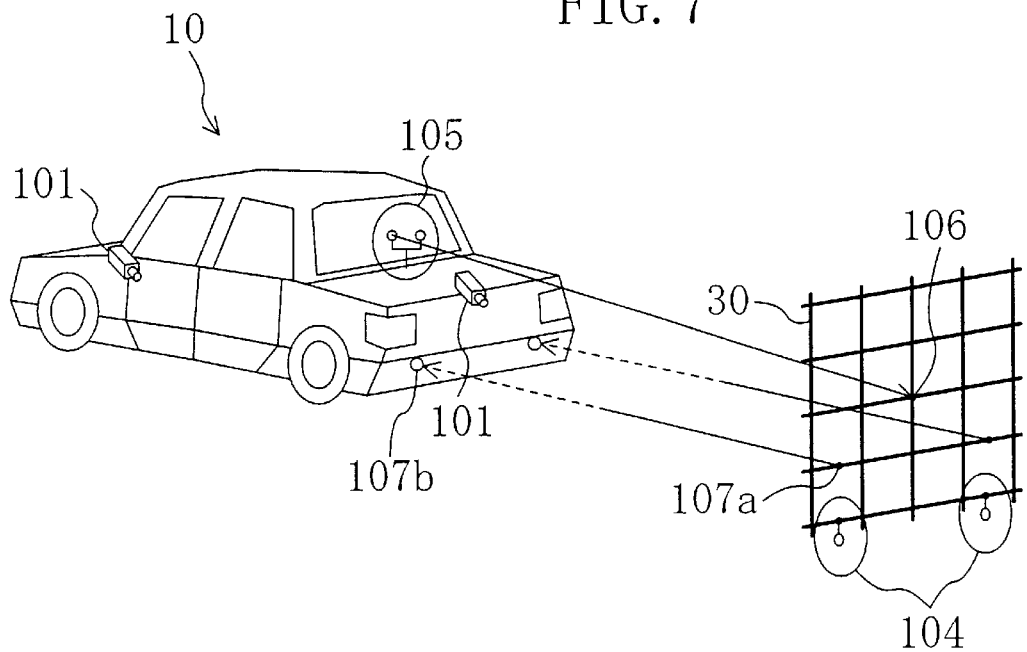
FIG. 7 is a modification of the structure of FIG. 6.

Note that, as shown in FIG. 7, the scope means 105 may be provided on the vehicle 10 with the target point 106 being defined on the target apparatus 30. The scope means 105 may be of either a fixed or detachable type. In the case of FIG. 7, however, the scope means 105 is desirably of a detachable type since it is necessary only during calibration. Since the scope means 105 is provided in order to adjust the position of the target apparatus 30, it is desirable that the scope means 105 is strongly fixed to the vehicle 10 or target apparatus 30 during calibration.

The scope means 105 may be detachably mounted at a plurality of positions on the target apparatus 30. This enables selection of a mounting position of the scope means 105 according to the type of the vehicle 10 when the cameras 101 on various vehicles 10 are to be calibrated. In this case, the position of the target point 106 on the vehicle 10 can be set with improved freedom.

Positional adjustment of the target apparatus 30 is conducted while looking the target point 106 through the scope means 105. For example, the target apparatus 30 may be finely positioned with the positional adjustment means 104 such that the target point 106 is located on the same line as that connecting the view point and the centers of two circular glasses 501.

Figure 8A:
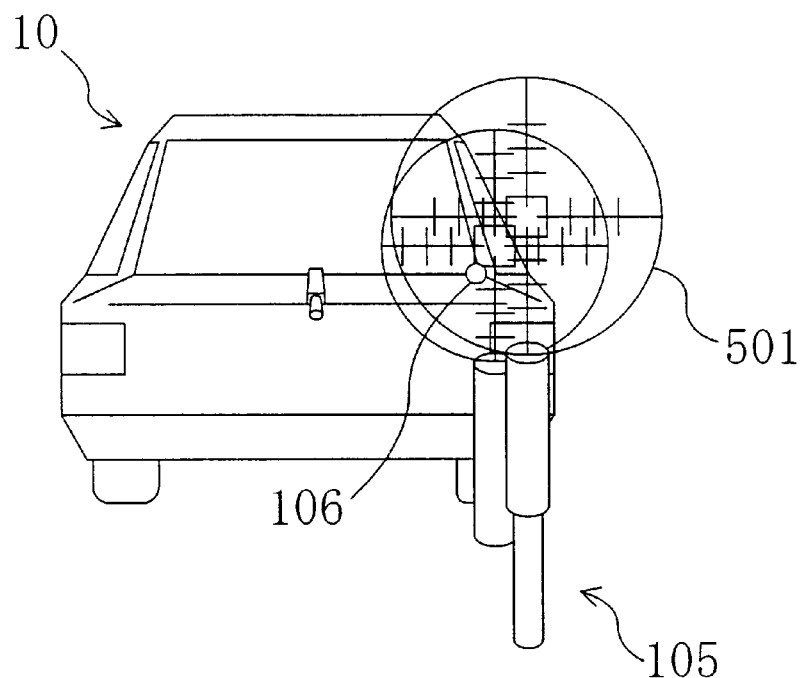
FIGS. 8A and 8B are diagrams showing positional adjustment of the case where the scope means is provided on a target apparatus.
Figure 8B:
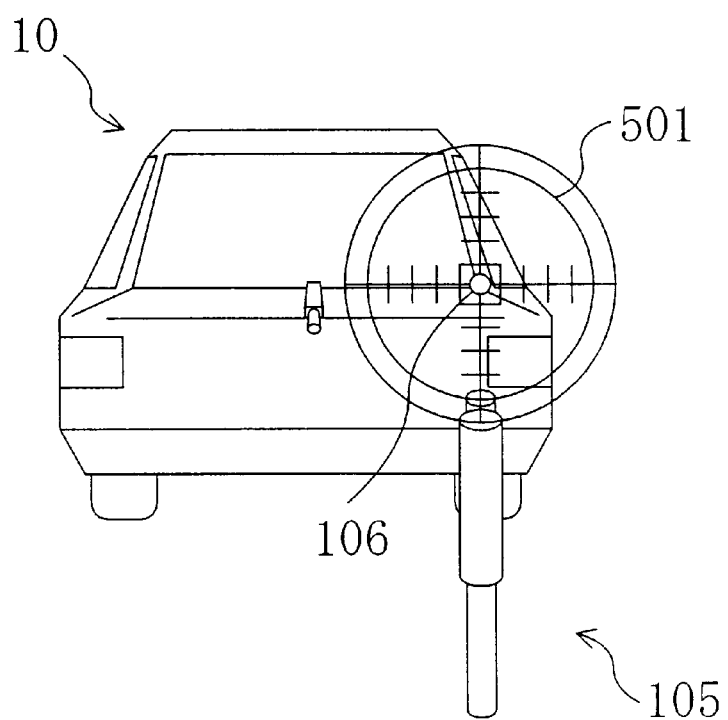

FIGS. 8A and 8B are diagrams showing the positional adjustment of the case where the scope means 105 is provided on the target apparatus 30. FIGS. 8A and 8B show the states before and after the positioning, respectively. In the example of FIGS. 8A and 8B, the target point 106 for positioning is set at the lower right end of the rear window of the vehicle 10, and the position of the target apparatus 30 is finely adjusted such that the target point 106 is located on the same line as that connecting the view point and the centers of two circular glasses 501.

Figure 9A:
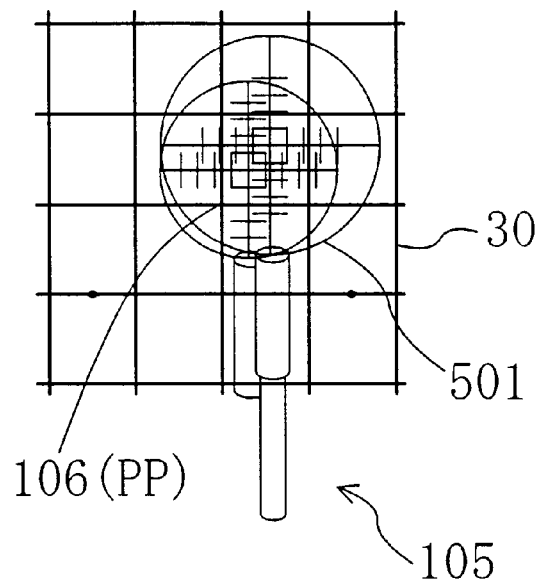
FIGS. 9A and 9B are diagrams showing positional adjustment of the case where the scope means is provided on a vehicle.
Figure 9B:
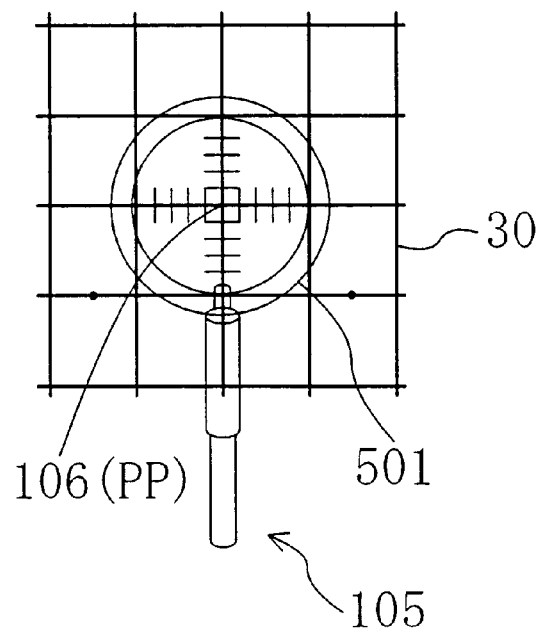

FIGS. 9A and 9B are diagrams showing the positional adjustment of the case where the scope means 105 is provided on the vehicle 10. FIGS. 9A and 9B show the states before and after the positioning, respectively. In the example of FIGS. 9A and 9B, the target point 106 for positioning is set at the central one of the feature points PP of the target apparatus 30, and the position of the target apparatus 30 is finely adjusted such that the target point 106 is located on the same line as that connecting the view point and the centers of two circular glasses 501. In the positioning operation as shown in FIGS. 8A and 8B or FIGS. 9A and 9B, a target presenting means such as LED may be provided at the target point 106 for improved visual recognition. Thus, the calibration efficiency can be improved.

Note that whether the scope means 105 is necessary or not is determined depending on a joint method for physically fixing the vehicle 10 and the target apparatus 30 to each other. More specifically, the scope means 105 is not necessary if it is ensured that a constant positional relation between the vehicle 10 and the target apparatus 30 is maintained as a result of fixing them.

It is also possible to eliminate the need for the positional adjustment means 104 by providing the joint means themselves with a function to finely adjust the position of the target apparatus 30. For example, in the case where a rod-like member is used as the joint means 107a of the target apparatus 30 and a hole is used as the joint means 107b of the vehicle 10 so that the joint means 107a is inserted into the joint means 107b, the position of the target apparatus 30 can be finely adjusted by varying the insertion depth of the joint means 107a. In this case, it is preferable to use the scope means 105 for positioning. It is also preferable that the positional relation between the vehicle 10 and the target apparatus 30 is fixed with a fixing member after the positional adjustment is completed.

Figure 10:
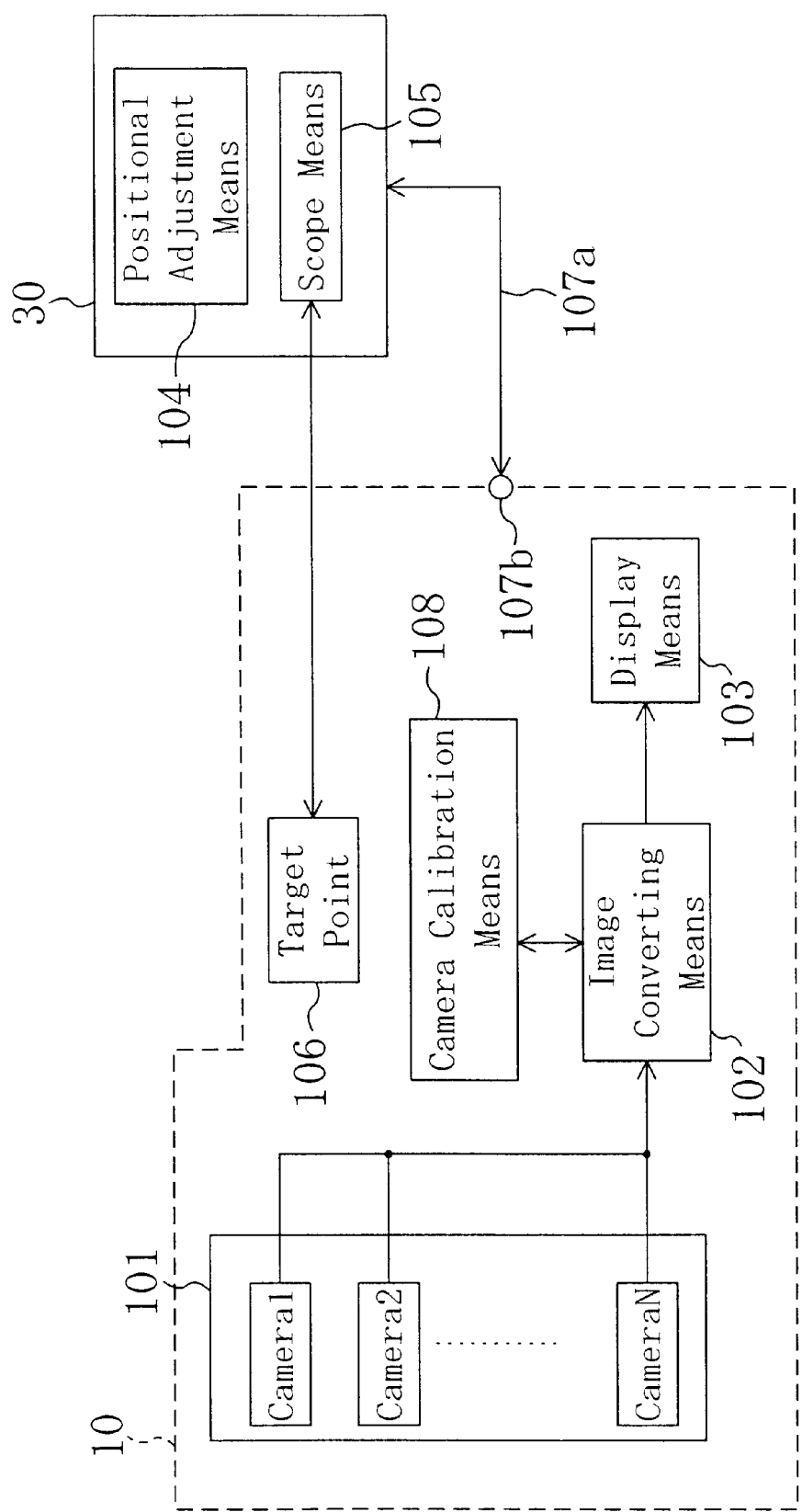
FIG. 10 is a block diagram functionally showing the structure of the calibration system according to the first embodiment of the present invention.

FIG. 10 is a block diagram functionally showing the structure of the calibration system according to the present embodiment. As shown in FIG. 10, the vehicle 10 includes, in addition to the cameras 101, a camera calibration means 108 for conducting calibration of the cameras 101, an image converting means 102 for applying a prescribed processing to the captured images of the cameras 101 for image conversion, and an image display means 103 such as a monitor for displaying the converted image. The vehicle 10 also includes the joint means 107b and target point 106 as described above. The target apparatus 30 includes the positional adjustment means 104, scope means 105 and joint means 107a as described above.

The camera calibration means 108, which conducts camera calibration based on calibration data described below, is not an essential element to be provided within the vehicle 10, since a real-time processing is not always required. The camera calibration means 108 can be implemented with a general-purpose computer capable of operating a calibration software. When implemented with a general-purpose computer, the camera calibration means 108 may be placed at a remote location from the vehicle 10 so that the obtained calibration data may be transmitted to the computer by means of a storage medium such as floppy disk and memory card, or through communication such as radio or cable communication.

Figure 11:
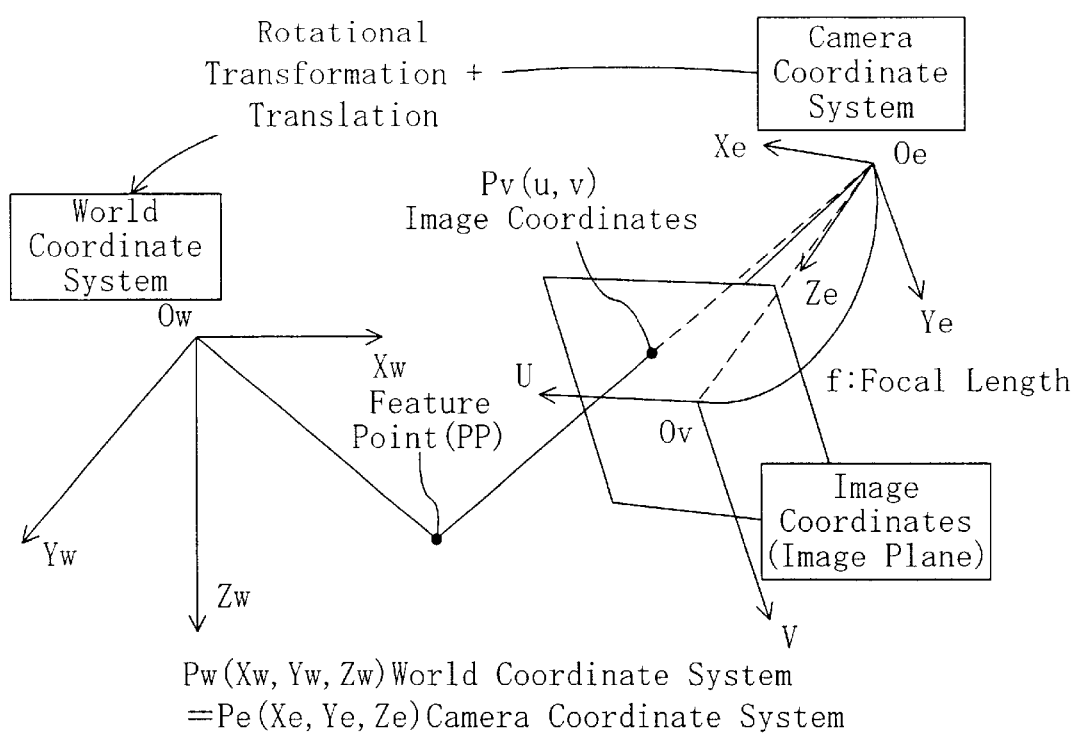
FIG. 11 is a diagram illustrating a calibration method, and showing the relation between a world coordinate system, a camera coordinate system and image coordinates based on a pinhole camera.

Hereinafter, a camera calibration method will be described briefly with reference to FIG. 11. For simplicity, it is herein assumed that a pinhole camera is used in which lens distortion, displacement of the optical axis and the like can be ignored. FIG. 11 is a diagram showing the relation between a world coordinate system, a camera coordinate system and image coordinates based on a pinhole camera model. In calibration, the position and orientation of the camera in the world coordinate system are calculated using the feature point PP.

In FIG. 11, f denotes the focal length of the camera, Pv(u, v) denotes an image coordinate value of the feature point PP as captured with the camera, Pe(Xe, Ye, Ze) denotes a coordinate value of the feature point PP in the camera coordinate system, Pw(Xw, Yw, Zw) denotes a coordinate value of the feature point PP in the world coordinate system. Provided that, regarding the relation between the camera coordinate system and the world coordinate system, a 3×3 rotation matrix for making the respective axes of the coordinate systems in parallel with each other is R(r11, ..., r33), and a translation vector for matching the respective origins is T(tx, ty, tz), Pv and Pw can be mapped with each other by the following equation:

$$\begin{pmatrix} X_w \\ Y_w \\ Z_w \end{pmatrix} = \begin{pmatrix} \left(\frac{u}{f}r_{11} + \frac{v}{f}r_{12} + r_{13}\right)Z_e + t_x \\ \left(\frac{u}{f}r_{21} + \frac{v}{f}r_{22} + r_{23}\right)Z_e + t_y \\ \left(\frac{u}{f}r_{31} + \frac{v}{f}r_{32} + r_{33}\right)Z_e + t_z \end{pmatrix}. \quad (1)$$

Specifically, camera calibration is nothing less than a process of obtaining each element of the rotation matrix R (corresponding to the orientation of the camera) and each element of the translation vector T (corresponding to the position of the camera). In the above equation, the number of unknown parameters for determining the orientation and position of the camera is six in total, i.e., three for the rotating matrix R (there are nine matrix elements, but independent parameters are only three rotation angles about the respective axes X, Y and Z because this is a rotation matrix), and three for the translation vector T.

Two equations for u and v can be obtained by substituting a set of the image coordinate value Pv(u, v) and its corresponding coordinate value Pw(Xw, Yw, Zw) in the world coordinate system, i.e., a set of calibration data, for the above equation. Accordingly, the aforementioned six parameter values can be obtained with at least three sets of calibration data. In practice, in order to reduce the effect of measurement error, the equation is generally solved by the least-square method or the like using the calibration data regarding as many feature points as possible that are dispersed in a wide range.

In order to conduct the camera calibration with high precision, a multiplicity of points each having a known exact coordinate value in a predetermined coordinate system, i.e., feature points PP, must be prepared within the monitoring range of the camera. It is herein the most important to accurately set the feature points PP to respective positions with known coordinate values. This means that the target apparatus 30 having the feature points PP must be accurately positioned with respect to the vehicle 10.

For example, the calibration data is manually created by the following two steps using the accurately positioned target apparatus 30:

1. The feature point PP is captured with the camera, and a coordinate value Pv(u, v) of the feature point PP on the camera image is specified. The coordinate value is manually specified by, for example, taking the camera image into a computer for display on the screen, moving the mouse cursor to the position of the feature point on the screen and then clicking on that position with a mouse; and
2. The coordinate value Pw(Xw, Yw, Zw) of the feature point PP in the world coordinate system is mapped with the specified coordinate value Pv(u, v) on the camera image, thereby creating the calibration data.

As has been described above, according to the present embodiment, even an unskilled person can easily fix the positional relation between the mobile object and the target apparatus to a prescribed relation by the joint means, scope means or the like. Accordingly, accurate positioning of the mobile object is no longer required for calibration, thereby simplifying calibration of the cameras mounted on the mobile object. Moreover, calibration does not require a large space, and therefore can be conducted at a small place. Moreover, the target apparatus can be realized in a portable, compact form.

(Embodiment 2)

According to the second embodiment of the present invention, the positional relation between the vehicle 10 and the target apparatus 30 is fixed to a prescribed relation by using the scope means without making the vehicle 10 and the target apparatus 30 in contact with each other. In other words, the joint means for physically fixing the vehicle 10 and the target apparatus 30 as in the first embodiment is not used in the second embodiment.

Figure 12:
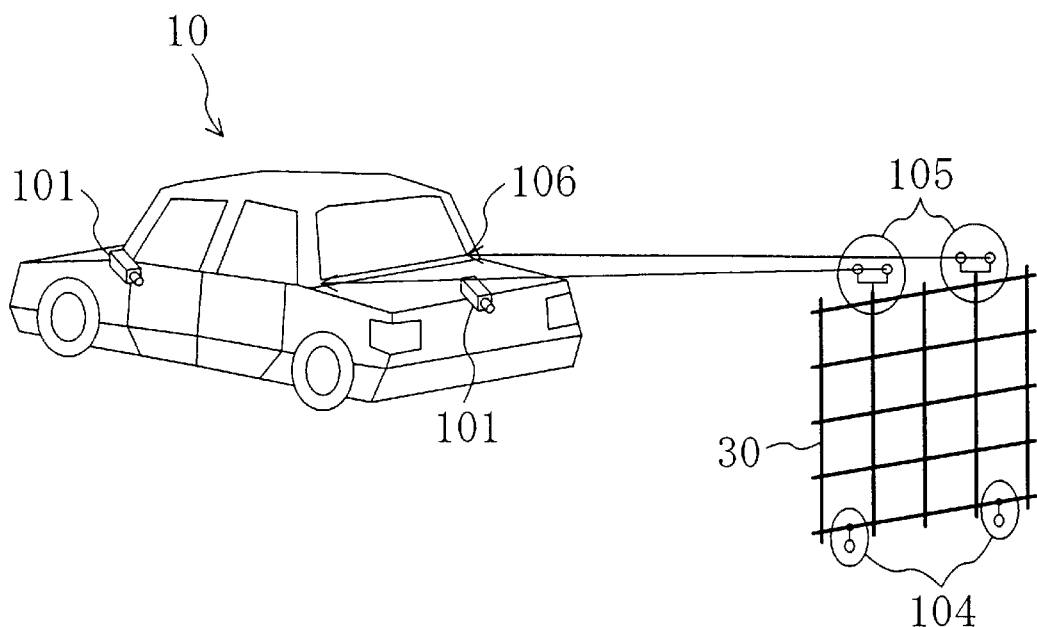
FIG. 12 is a diagram showing the structure of a calibration system according to a second embodiment of the present invention.

FIG. 12 is a diagram showing the structure of a calibration system according to the present embodiment. In FIG. 12, the vehicle 10 having the cameras 101 mounted thereon and the target apparatus 30 are not physically fixed to each other. The target apparatus 30 is positioned by visually confirming the target points 106 on the vehicle 10 by the respective scope means 105 on the target apparatus 30. The positional adjustment means 104 and the scope means 105 each has the same structure as that described in the first embodiment. The positional adjustment means 104 and the scope means 105 form a positioning means according to the present embodiment.

Figure 13A:
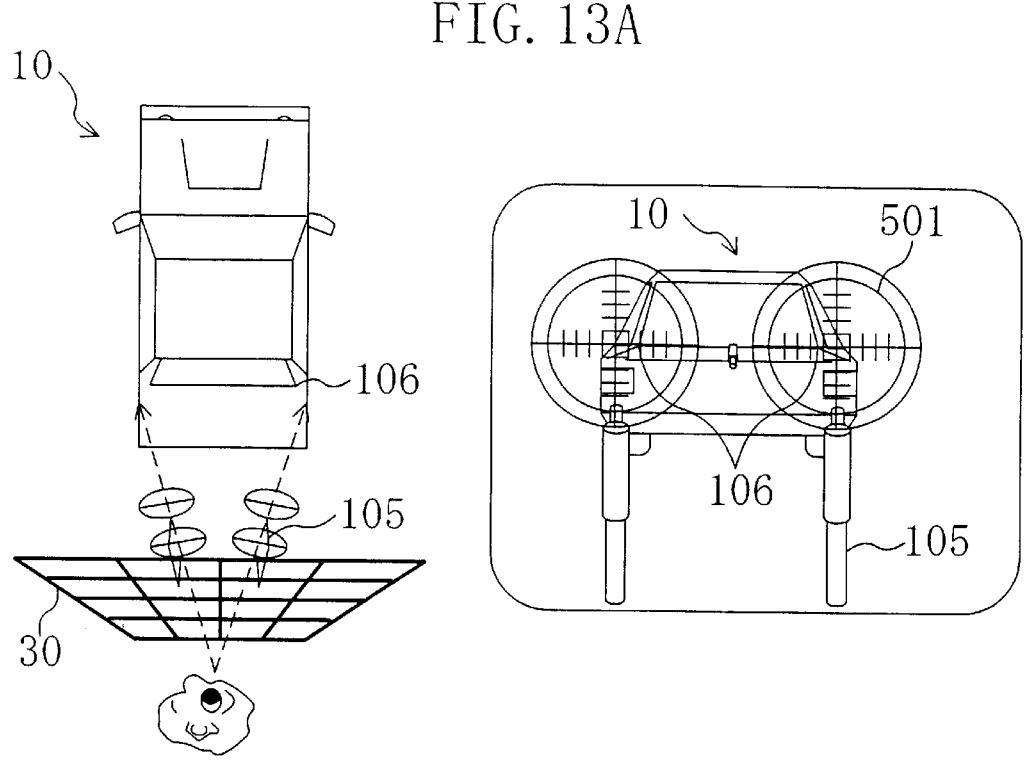
FIGS. 13A and 13B are diagrams showing positional adjustment of a target apparatus according to the second embodiment of the present invention.
Figure 13B:
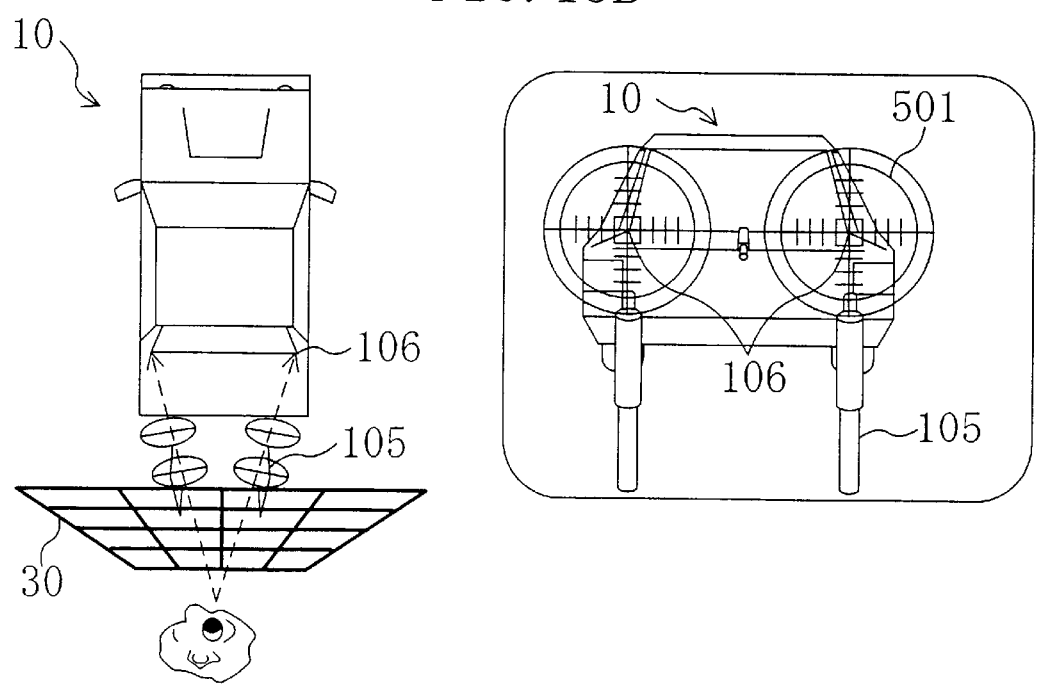

FIGS. 13A and 13B are diagrams showing positional adjustment of the target apparatus 30 according to the present embodiment. FIGS. 13A and 13B show the states before and after positioning, respectively. In the example of FIGS. 13A and 13B, the target points 106 for positioning are respectively set at the lower right and left corners of the rear window of the vehicle 10. The position of the target apparatus 30 is finely adjusted such that each target point 106 is located on the same line as that connecting the view point and the centers of two circular glasses 501 of the corresponding scope means 105.

Note that the structure of the scope means 105 is not limited to that described herein, and another structure may also be possible. For example, a laser-beam emitting apparatus may be used as the scope means, and the position of the target apparatus 30 may be adjusted such that the emitted laser beam light is incident on the target point 106. This is advantageous in that the position can be confirmed without looking through a scope. Alternatively, a reflecting plate may be provided at the target point 106 in order to facilitate confirmation that the laser beam light is incident on the target point 106. The scope means may also be provided with a means for receiving the reflected light, so as to notify completion of the positional adjustment with a sound such as buzzer in response to reception of the reflected light at the light-receiving means.

Figure 14A:
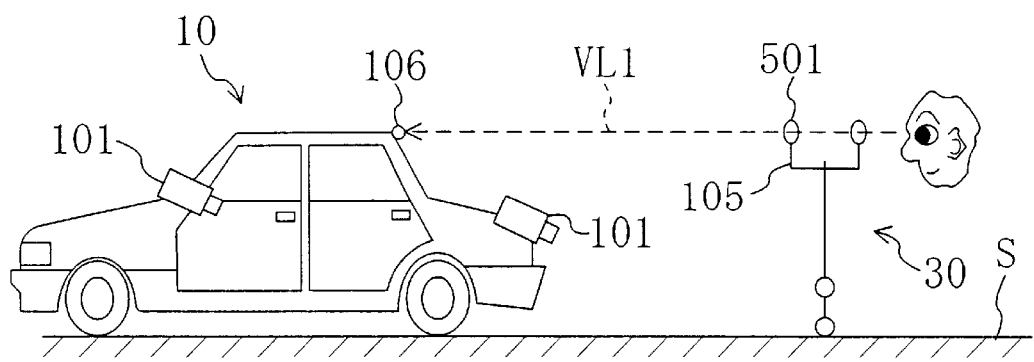
FIGS. 14A, 14B and 14C are diagrams illustrating the points to notice regarding the mounting position of scope means.
Figure 14B:
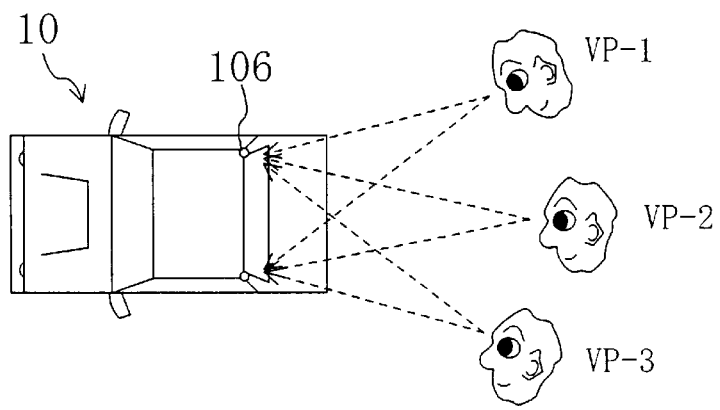
Figure 14C:
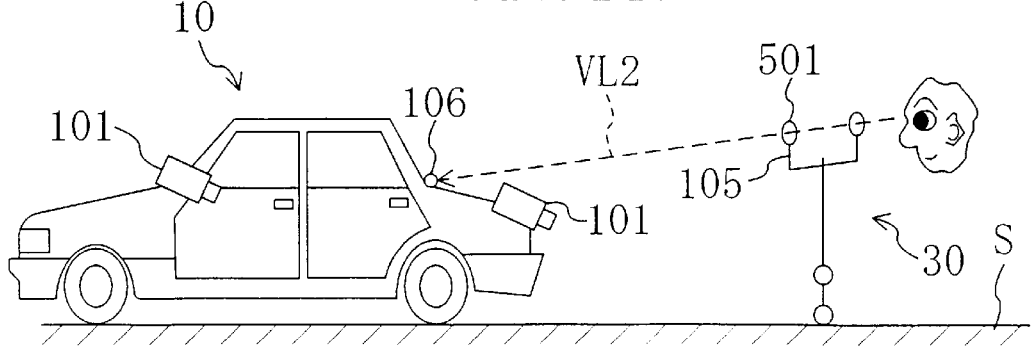

Hereinafter, the points to notice will be described in terms of the mounting positions of the scope means. Depending on the mounting position of the scope means, there may possibly be many positions of the target apparatus where the target point and the centers of the two circular glasses exactly match each other. This will be described with reference to FIGS. 14A, 14B and 14C. In FIGS. 14A, 14B and 14C, it is assumed that positioning of the target apparatus is conducted using two scope means, and that the target apparatus 30 has a fixed height and is movable in the four directions (front, rear, right and left) on the plane where the vehicle 10 is located (i.e., the road surface S).

In the case of FIG. 14A, a line of sight VL1 through the scope means 105 is in parallel with the road surface S, and extends through the target point 106. In this case, there are many positions of the target apparatus 30 where the respective target point 106 and the centers of the two circular glasses 501 of each scope means 105 provided on the target means 30 match each other. For example, as shown in FIG. 14B, when the target points 106 at the upper right and left corners of the rear window of the vehicle 10 are viewed from each of the positions VP-1, VP-2, VP-3, each target point 106 exactly matches the centers of the two circular glasses 501 when viewed through the scope means 105. This makes it difficult to locate the target apparatus 30 at a correct position.

For example, in order to avoid such a disadvantage, a line of sight VL2 through the scope means 105 may be rendered at an angle with the plane on which the target apparatus 30 is moved, i.e., the road surface S, as shown in FIG. 14C. Note that, in the case of using three or more scope means as well, the positions of the scope means and the target points must be carefully determined in view of the possibility of the same disadvantage.

(Embodiment 3)

Calibration data may be manually created in the case of using only a small number of feature points or calibrating only a small number of cameras. However, if a large number of feature points are used or a large number of cameras must be calibrated, such a manual operation would be extremely time-consuming in terms of calibration. Moreover, inputting the image coordinates of the feature points requires close attention. Therefore, long-time operation is hard for the operator, and also the tired operator may wrongly input the coordinates, which may result in degraded calibration accuracy. In view of this, the calibration data is automatically created in the third embodiment of the present invention.

Figure 15:
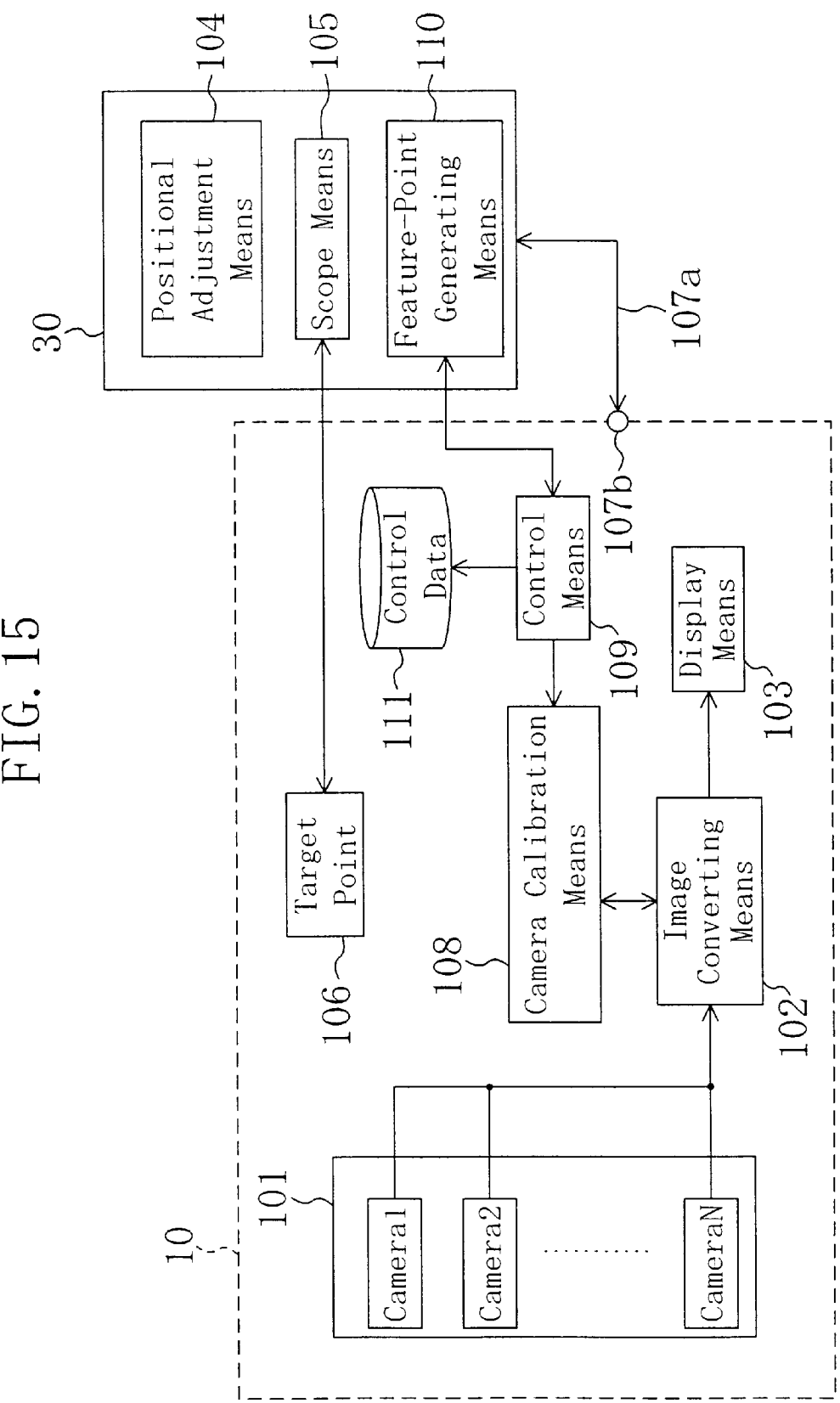
FIG. 15 is a block diagram functionally showing the structure of a calibration system according to a third embodiment of the present invention.

FIG. 15 is a block diagram functionally showing the structure of a calibration system according to the third embodiment of the present invention. In FIG. 15, the same components as those of FIG. 10 are denoted with the same reference numerals and characters, and detailed description thereof is herein omitted. The vehicle 10 includes control means 109 for controlling the target apparatus 30, and storage means for storing control data 111 for automatically creating the calibration data. The target apparatus 30 includes feature-point generating means 110 for generating a feature point according to a control signal from the control means 109.

The control means 109 transmits a control signal to the feature-point generating means 110 so as to cause the feature-point generating means 110 to generate a feature point required to adjust the camera 101, whereby the calibration data is automatically or semi-automatically created. Thus, high-speed, simplified calibration of the camera 101 is implemented. Specific processing will be described later.

Figure 16:
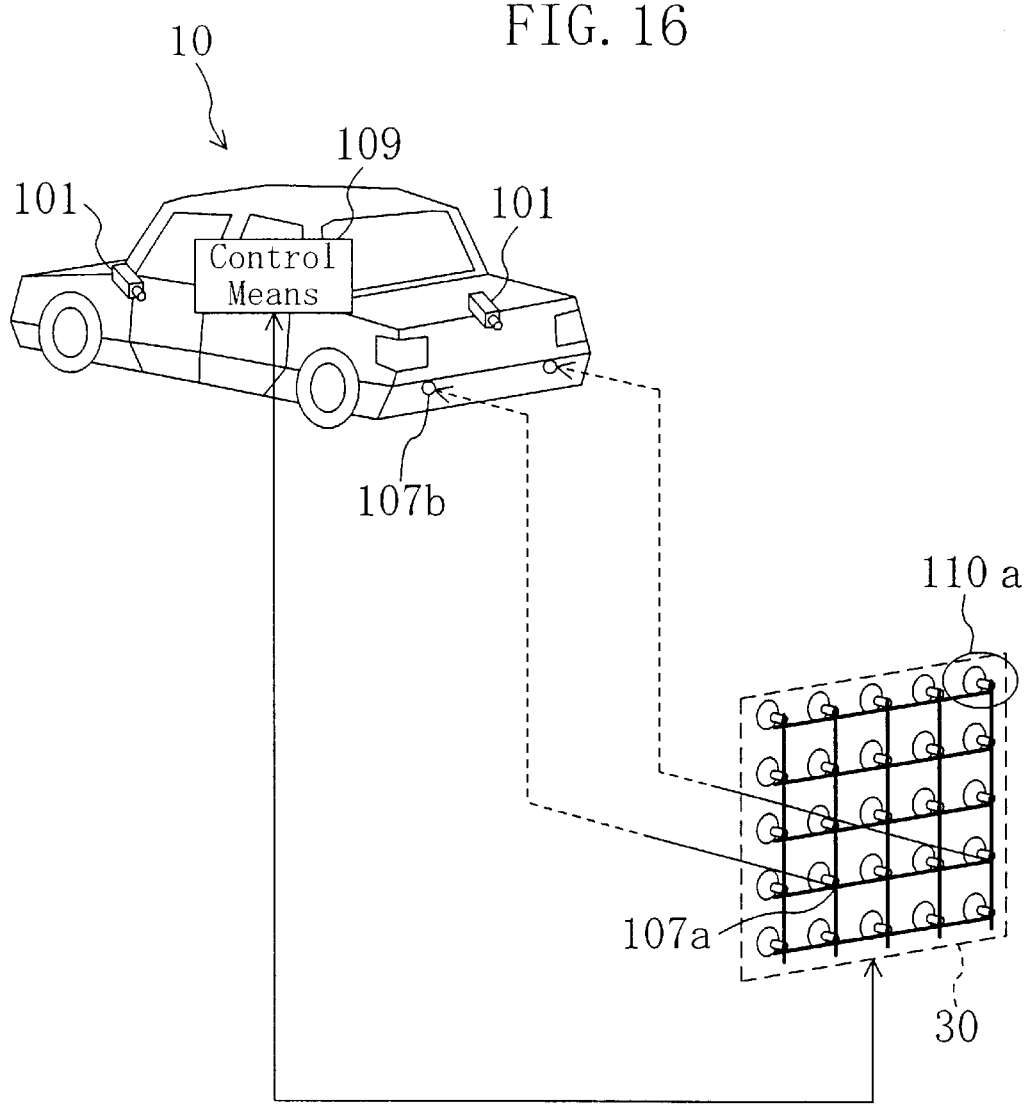
FIG. 16 is a diagram showing the structure of the calibration system according to the third embodiment of the present invention.

FIG. 16 is a diagram showing the structure of a calibration system according to the present embodiment. In FIG. 16, the feature-point generating means 110 generates a feature point by using light-emitting means 110a. More specifically, an internal driving means (not shown) receives a control signal from the control means 109 and causes the light-emitting means 110a to generate a feature point for calibration accordingly. In the case where the camera 101 is a normal CCD (charge coupled device) camera or an infrared camera, an electronic flash, incandescent lamp or the like can be used as the light-emitting means 110a.

Hereinafter, the process of automatically or semi-automatically creating the calibration data using the light-emitting feature points will be described.

For example, an inter-frame difference method is effective as a method for automatically detecting a light-emitting position. In the inter-frame difference method, the difference between successive two frames is calculated in order to extract the position having the maximum difference. In the case of using the inter-frame difference method, the process of extracting a feature point includes the following steps:

(ST1) calculation of the difference between frames is initiated;

(ST2) the control means 109 transmits to the target apparatus 30 a control signal for initiating light-emission of a feature point;

(ST3) the feature-point generating means 110 receives the control signal, and causes light emission of the corresponding feature point;

(ST4) a frame is extracted that has the maximum integral value of the difference between frames during a prescribed time period after the control means 109 outputs the control signal; and (ST5) regarding the frame extracted in Step ST4, a coordinate value of the point having the peak difference is obtained, and this coordinate value mapped with a spatial coordinate value of the light-emitting feature point is stored as calibration data of the camera 101.

By conducting the series of Steps ST1 to ST5 for every controllable feature point, the calibration data of the camera 101, i.e., the data having spatial coordinates of each feature point mapped with a coordinate value on the captured image can be automatically produced. Thus, efficiency of the camera calibration can be significantly improved.

In order to perform such a process as described above, the control means 109 retains in advance the data having the number of each feature point of the target apparatus 30 mapped with spatial coordinates thereof as the control data 111. Table 1 below is an example of the control data 111.

TABLE 1

| Feature Point No. | Spatial Coordinate Value of Feature Point |
|---|---|
| 1 | (X1, Y1, Z1) |
| 2 | (X2, Y2, Z2) |
| . | . |
| . | . |
| . | . |
| N | (XN, YN, ZN) |

The control means 109 sequentially obtains the feature point numbers from the control data 111 as shown in Table 1, and transmits a control signal to the target apparatus 30 so as to cause light emission of the feature point corresponding to the feature point number. Then, by conducting Steps ST1 to ST5, coordinates of the feature point on the captured image of the camera 101 are obtained. This coordinate value is mapped with a spatial coordinate value of the feature point in the control data 111, whereby a pair of calibration data is obtained.

It is assumed in Table 1 that the target apparatus 30 is installed at only one position. If there are a plurality of installation positions of the target apparatus 30, like when the camera 101 monitors the rear and the right and left sides of the vehicle 10, the data having each feature point number mapped with a spatial coordinate value thereof must be prepared for every installation position of the target apparatus 30. Table 2 is an example of the control data 111 for such a case.

TABLE 2

| Installation Position No. | Feature Point No. | Spatial Coordinate Value of Feature Point |
|---|---|---|
| 1 | 1 | (X11, Y11, Z11) |
| 1 | 2 | (X12, Y12, Z12) |
| . | . | . |
| . | . | . |
| . | . | . |
| 1 | N | (X1N, Y1N, Z1N) |
| 2 | 1 | (X21, Y21, Z21) |
| 2 | 2 | (X22, Y22, Z22) |
| . | . | . |
| . | . | . |
| . | . | . |
| 2 | N | (X2N, Y2N, Z2N) |
| M | 1 | (XM1, YM1, ZM1) |
| M | 2 | (XM2, YM2, ZM2) |
| . | . | . |
| . | . | . |
| M | N | (XMN, YMN, XMN) |

The control means 109 first obtains an installation position of the target apparatus 30 according to a prescribed method, and takes from the control data 111 as shown in Table 2 only the data having an installation position number corresponding to the installation position. With this data, the control means 109 then sequentially obtains the feature point numbers and transmits a control signal to the target apparatus 30 so as to cause light emission of the feature point corresponding to the obtained feature point number. Thereafter, by conducting Steps ST1 to ST5, the coordinates of the feature point on the captured image of the camera 101 are obtained. This coordinate value is mapped with a special coordinate value of that feature point within the data, whereby a pair of calibration data is obtained.

Basically, the control data 111 need be measured only once initially. Even if any positional displacement of the camera 101 occurs for some reason, the same control data 111 can be used for re-calibration as long as the positional relation between the vehicle 10 and the target apparatus 30 has not been changed. However, if the joint means are deformed by any impact, or the scope means and/or target points are deformed, the spatial coordinate values of the feature points described in the control data 111 themselves may possibly be deviated. In such a case, it is desirable to re-measure the spatial coordinate values of the feature points. Whether or not any positional displacement of the camera 101 has occurred or not can be easily determined by installing the target apparatus 30 and monitoring the installed target apparatus 30 with the camera 101 to see if a feature point is located at a prescribed position on the image converted by the image converting means 102.

Note that, for transmission of the control signal, a special line (including radio transmission) connecting the control means 109 and the feature-point generating means 110 may be provided, or a signal line may be incorporated into the joint means 107a, 107b. Moreover, transmission of the power required for light emission of the feature points from the vehicle 10 to the target apparatus 30 through the joint means 107a, 107b would eliminate the need to independent power supply to the target apparatus 30. Thus, reduction in size and weight of the target apparatus 30 can be realized.

As has been described above, according to the present embodiment, collection of calibration data, which is burdensome in the manual operation, can be conducted automatically, whereby the calibration efficiency can be significantly improved.

(Embodiment 4)

In each of the above embodiments, the positional relation between the mobile object having cameras mounted thereon and the target apparatus for calibrating the cameras is fixed to a prescribed relation either physically (with contact) or without contact. In contrast, in the fourth embodiment of the present invention, the mobile object and the target apparatus are appropriately disposed, and then the positional relation therebetween is obtained, so that camera calibration is conducted using the positional relation thus obtained.

Figure 17:
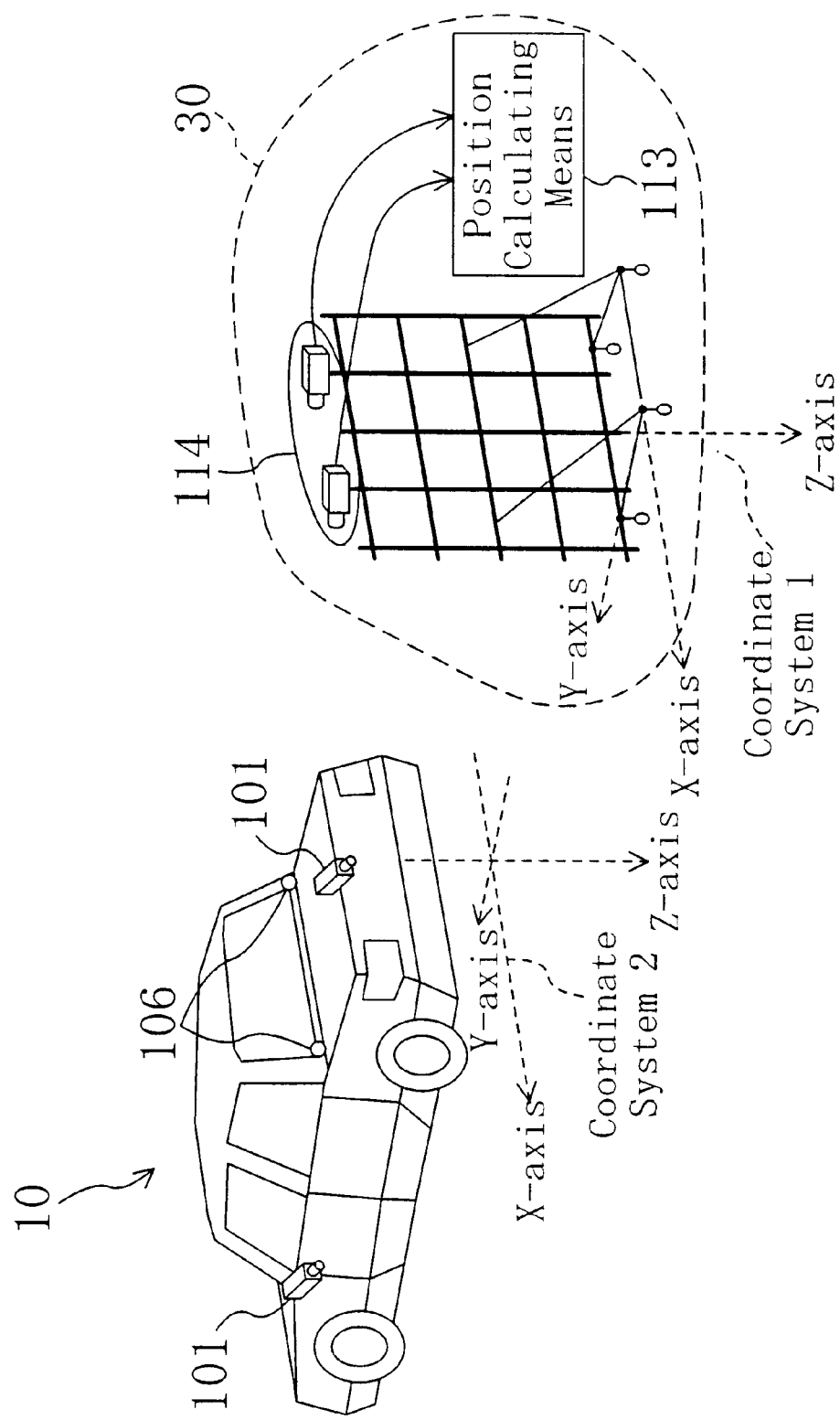
FIG. 17 is a diagram showing the structure of a calibration system according to a fourth embodiment of the present invention.

FIG. 17 is a diagram showing the structure of a calibration system according to the present embodiment. As shown in FIG. 17, the target apparatus 30 according to the present embodiment includes a target data obtaining means 114 formed from stereo cameras (cameras having the same focal length and disposed such that their respective optical axes become in parallel with each other and their respective image planes are located on the same plane), and a position calculating means 113 for calculating the positional relation of the target apparatus 30 itself with the vehicle 10 from the data obtained by the target data obtaining means 114. The position calculating means 113 and the target data obtaining means 114 form a positional-relation estimating means according to the present invention.

The target data obtaining means 114 obtains a coordinate value in a coordinate system based on the target apparatus 30 (coordinate system 1), regarding each target point 106 having a known position in a coordinate system based on the vehicle 10 (coordinate system 2). The position calculating means 113 calculates the positional relation of the target apparatus 30 with the vehicle 10 from the coordinate values obtained by the target data obtaining means 114, and calculates a coordinate value of each feature point of the target apparatus 30 in the coordinate system 2 based on the calculated positional relation.

Figure 18:
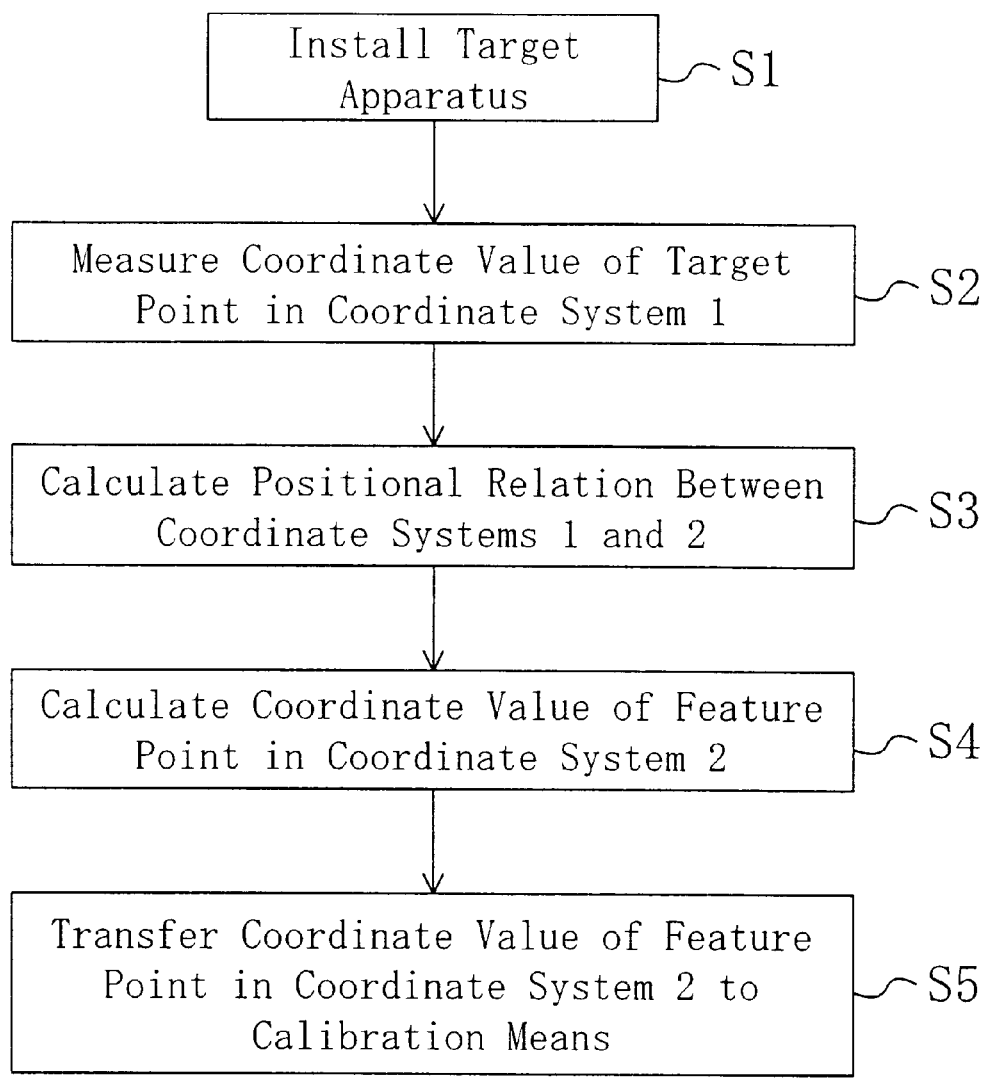
FIG. 18 is a flowchart showing a flow of the process of calculating a coordinate value of a feature point.

FIG. 18 is a flowchart illustrating a flow of the process of calculating the coordinate value of the feature point in the coordinate system 2. For simplicity, it is herein assumed that individual cameras forming the stereo cameras are ideal pinhole cameras having no lens distortion and the like.

First, in Step S1, the target apparatus 30 is installed. Herein, the target apparatus 30 is positioned such that the respective images of the stereo cameras forming the target data obtaining means 114 include the target points 106. This is because the positional relation between the vehicle 10 and the target apparatus 30 is calculated under the condition that all of the target points 106 required for calculation are included in the stereo camera images. However, since the ultimate goal is to calibrate the cameras 101 mounted on the vehicle 10, it is desirable to install the target apparatus 30 such that the feature points are caught by the cameras 101 as extensively as possible while satisfying the above condition.

After the target apparatus 30 is installed, the coordinate system 1 based on the target apparatus 30 is set appropriately. The coordinate system 1 is used to calculate the coordinate values of the target points 106. Therefore, the coordinate system 1 may be set based on any point of the target apparatus 30. Note that a camera parameter of the stereo cameras in the coordinate system 1 must be calculated in advance.

Then, in Step S2, the coordinate values of the target points 106 in the coordinate system 1 are measured. In other words, all of the target points 106 required for calculation are captured with the stereo cameras forming the target data obtaining means 114, whereby the respective coordinate values of the target points 106 in the coordinate system 1 are calculated.

For example, in FIG. 19, provided that the baseline of the stereo cameras is b, the coordinate values of the target point 106 on the right and left images are (Xr, Yr) and (X1, Y1), respectively, and d=X1−Xr, a coordinate value (X1, Y1, Z1) of the target point 106 in the coordinate system 1 can be calculated by the following equations based on the principles of triangulation:

$X1 = b(X1+Xr)/2d;$ $Y1 = b(Y1+Yr)/2d;$ and $Z1 = bf/d.$

The respective coordinate values of the target point 106 in the right and left camera images, (Xr, Yr) and (X1, Y1), may either be manually obtained by, e.g., clicking with a mouse or automatically.

Then, in Step S3, the positional relation between the coordinate system 1 and the coordinate system 2 based on the vehicle 10 is calculated. After the coordinate values in the coordinate system 1 are obtained for all the target points 106, unknown parameters ri (i=1 to 9), tx, ty, tz representing the positional relation between the coordinate systems 1 and 2 are obtained using the coordinate values. These unknown parameters are given by the following equation:

$$\begin{pmatrix} x_2 \\ y_2 \\ z_2 \end{pmatrix} = \begin{pmatrix} r_1 & r_2 & r_3 \\ r_4 & r_5 & r_6 \\ r_7 & r_8 & r_9 \end{pmatrix} \begin{pmatrix} x_1 \\ y_1 \\ z_1 \end{pmatrix} + \begin{pmatrix} t_x \\ t_y \\ t_z \end{pmatrix}. \quad (2)$$

In Equation (2), ri is an element of a 3×3 matrix representing rotation for making the coordinate axes of the coordinate system 1 in parallel with the respective coordinate axes of the coordinate system 2; and tx, ty, tz are elements of a translation vector for moving the origin of the coordinate system 1 to the origin of the coordinate system 2. By obtaining these unknown parameters, the coordinates (X1, X1, Z1) in the coordinate system 1 can be transformed into the coordinates (X2, Y2, Z2) in the coordinate system 2. These unknown parameters can be obtained by substituting a set of the respective coordinates of the target point 106 in the coordinate systems 1 and 2 for Equation (2) and solving the resultant simultaneous equations.

Note that Equation (2) seems to have twelve unknown parameters. However, since ri is formed from rotation parameters about X, Y and Z axes of the coordinate system 1, the number of original variables is three. Accordingly, the total number of unknown parameters is six. Thus, the unknown parameters can be obtained with at least two sets of target values 106 (because three equations are obtained from a single set). Note that, in practice, in order to reduce calculation error, many target points are generally used to obtain the equations, so that the unknown parameters best satisfying the equations are obtained by, e.g., the least-square method.

Then, in Step S4, coordinate values of the feature points of the target apparatus 30 in the coordinate system 2 are calculated. More specifically, since the parameters representing the positional relation between the coordinate systems 1 and 2 are obtained in Step S3, the coordinate value of each feature point in the coordinate system 1 can be transformed into a coordinate value in the coordinate system 2. This transformation is conducted by merely inputting the pre-measured coordinate value of the feature point in the coordinate system 1 as (X1, Y1, Z1) of Equation (2).

Then, in Step S5, the coordinate values of the feature points in the coordinate system 2 are transferred to the camera calibration means 108 of the vehicle 10. For example, this coordinate value data may be in such a form as shown in Table 1 above. Thus, the coordinate values in the coordinate system 2 of the feature points caught by the cameras 101 are available to the calibration means 108. Accordingly, calibration of the cameras 101 can be conducted.

Figure 20:
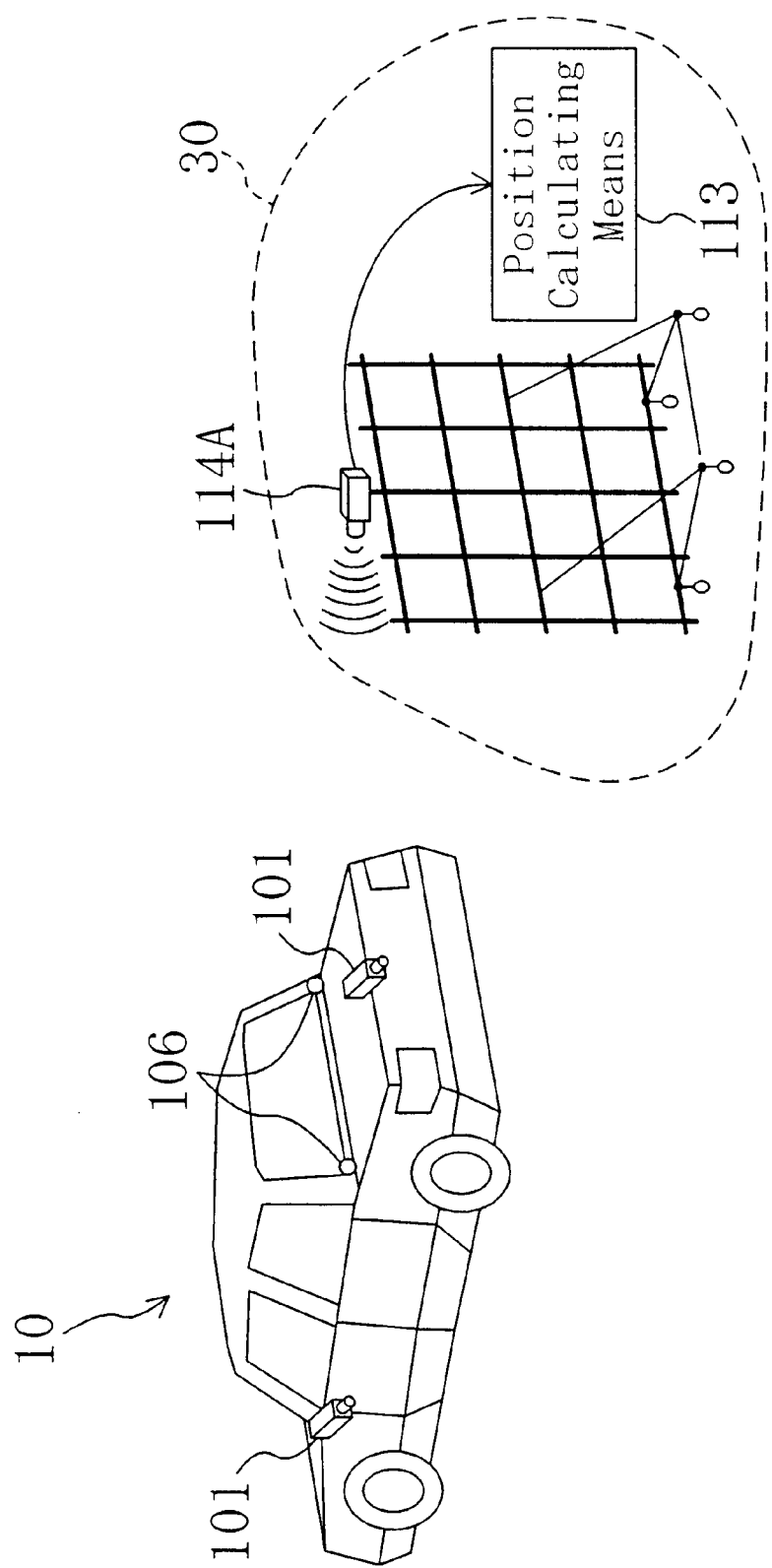
FIG. 20 is a diagram showing another structure of the calibration system according to the fourth embodiment of the present invention.

Note that, in the present embodiment, the stereo cameras are used to measure the coordinate values in the coordinate system 1 of the target points 106 on the vehicle 10. However, it should be appreciated that other methods may alternatively be used. For example, as shown in FIG. 20, distance measurement radar may be used as a target data obtaining means 114A. In this case, a radar reflecting plate is provided at the target points 106.

Moreover, the present embodiment may be combined with the third embodiment. More specifically, the vehicle 10 may sequentially cause the feature points of the target apparatus 30 to emit light.

(Applications to Services)

The effects of the present invention allow the camera calibration to be developed as service businesses at places other than those with a large site like factories. For example, camera calibration can be provided as a part of services at a car-maintenance service center. Accordingly, businesses receiving compensation for services from the customers can be realized. Since it is expected that the vehicle surrounding monitoring systems be widely used in the future and there be exchange or addition of the camera and a possibility of frequent positional displacement of the camera due to a traffic accident or vehicle running, it is naturally expected that such the service business is widely disseminated.

Assuming that the calibration according to the present invention will be actually carried out at service centers in the future, the procedures thereof will be briefly described with reference to FIG. 21.

Step SS1

The target apparatus 30 stored at the service center is installed near the vehicle 10 having the cameras 101 to be calibrated mounted thereon. The installation position of the target apparatus 30 is determined such that the target data obtaining means 114 of the target apparatus 30 can catch the target points 106 on the vehicle 10 and that the cameras 101 catch the feature points on the target apparatus 30 as many as possible.

Step SS2

The target points 106 are caught by the target data obtaining means 114. For example, in the case where the stereo cameras are used as the target data obtaining means 114, images including the target points 106 are captured with both the right and left cameras.

Step SS3

The positional relation between the vehicle 10 and the target apparatus 30 is obtained by the position calculating means 113, and the coordinate values of the feature points as viewed from the vehicle 10 are calculated. This calculation result is then transmitted to the camera calibration means 108 of the vehicle 10. This transmission may be conducted by any method. For example, the transmission may be conducted over a cable or radio network, or by means of a storage medium such as floppy disk and memory card.

Step SS4

The camera calibration means 108 calibrates each camera 101 based on both the image coordinates of the feature points captured with the cameras 101 and the coordinate data of the feature points received from the target apparatus 30.

Note that, in the case where the respective positions and orientations of the cameras 101 are different and not all of the cameras 101 can be calibrated by conducting the series of Steps SS1 to SS4 only once, the series of Steps SS1 to SS4 is conducted repeatedly. For example, in the case where the cameras 101 are respectively mounted at the four sides (front, rear, right and left) of the vehicle 10 so as to be oriented outward, the target apparatus 30 is placed to face each side of the vehicle, so that the series of Steps SS1 to SS4 is conducted once for each side. It should be appreciated that, in such a case, the target points 106 must be provided not only on the rear side of the vehicle, but also on the front, right and left sides thereof.

Note that, in each of the above embodiments, the image converting means 102 and the display means 103 are provided inside the vehicle 10. However, these means may alternatively be provided at other positions.

Moreover, the present invention is also applicable in the case where the cameras are mounted on the mobile objects other than the vehicles, such as trains, airplanes or robots.

(Supplementary Explanation)

In the case where the cameras are merely used for monitoring, not so precise calibration is required. For example, however, precise calibration is required in the case where image synthesis is conducted using camera images, or in the case where the distance from a camera image to another object is measured. The present invention is highly effective in such applications.

The reason why such precise calibration is required will be supplemented.

Figure 22A:
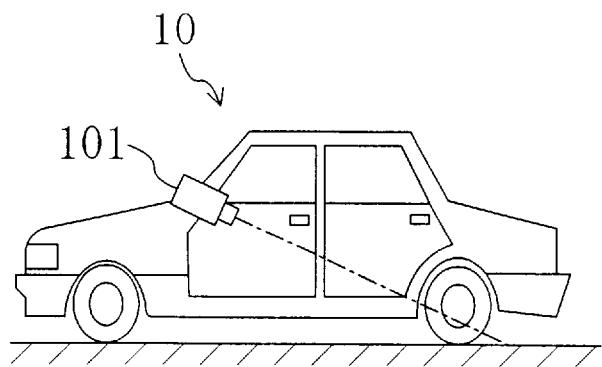
FIGS. 22A, 22B and 22C are diagrams illustrating the reason why precise camera calibration is required.
Figure 22B:
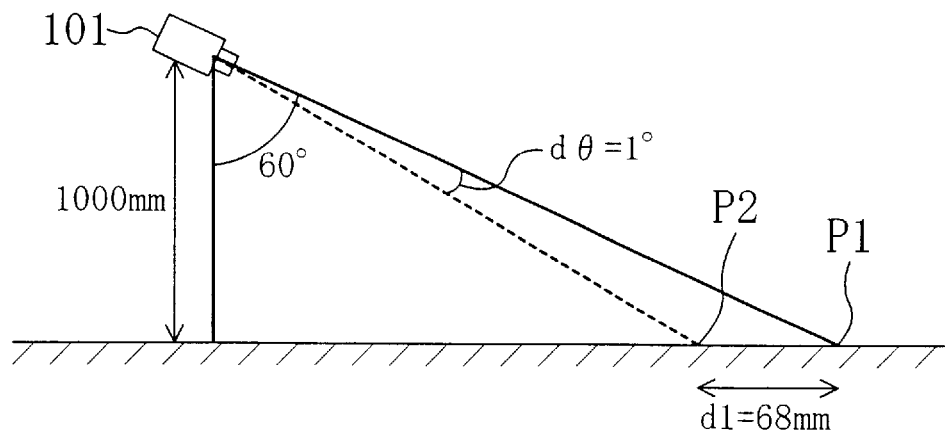

It is now assumed that the camera 101 monitoring the road surface rearward is mounted on the vehicle 10 as shown in FIG. 22A. As shown in FIG. 22B, the camera 101 is mounted at a height h of 1,000 mm above the ground, and orientation θ of 60° from the vertical axis.

It is now assumed that the optical axis of the camera 101 is displaced and the orientation θ thereof is shifted downward by dθ (=1°), as shown in FIG. 22B. At this time, the point on the road surface corresponding to the center of the optical axis of the camera 101 is shifted from the position P1 to position P2. The distance d1 between the positions P1 and P2 is given by the following equation:

$$d1 = h \times (\tan\theta - \tan(\theta - d\theta))$$
$$= 1,000 \times (\tan 60° - \tan 59°)$$
$$= 67.8 \text{ mm.}$$

Thus, the displacement is equal to about 7 cm. If the orientation of the camera 101 varies by 3°, displacement of about 19 cm is produced according to the same calculation. In view of the fact that the white line on the road serving as a road sign is about 15 cm wide, variation in orientation by 3° causes the displacement larger than the width of the white line. For example, this means that, if the images of two cameras projected onto the road surface are joined into a single image, the white line is not continuous on the resultant image.

Figure 22C:
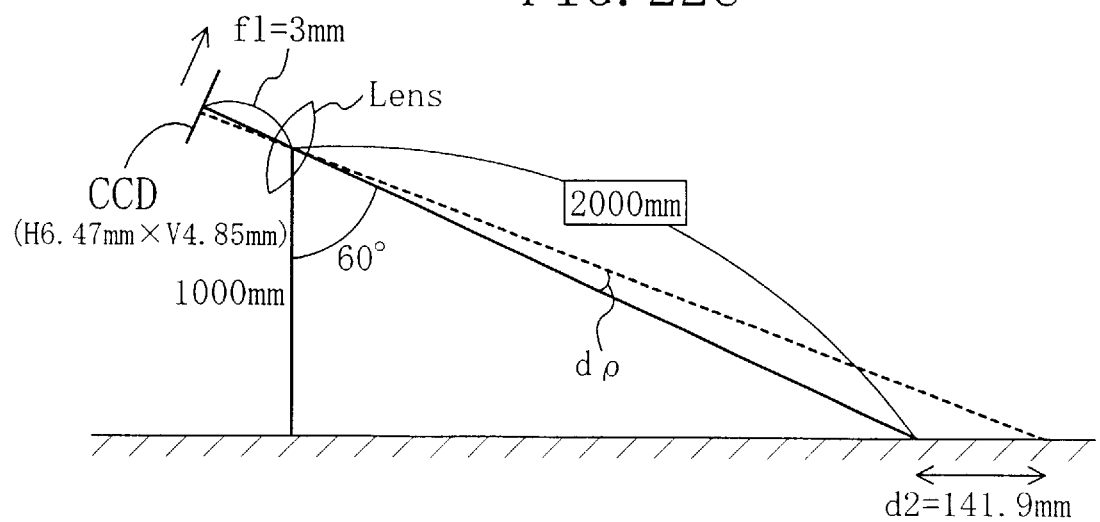
Figure 23:
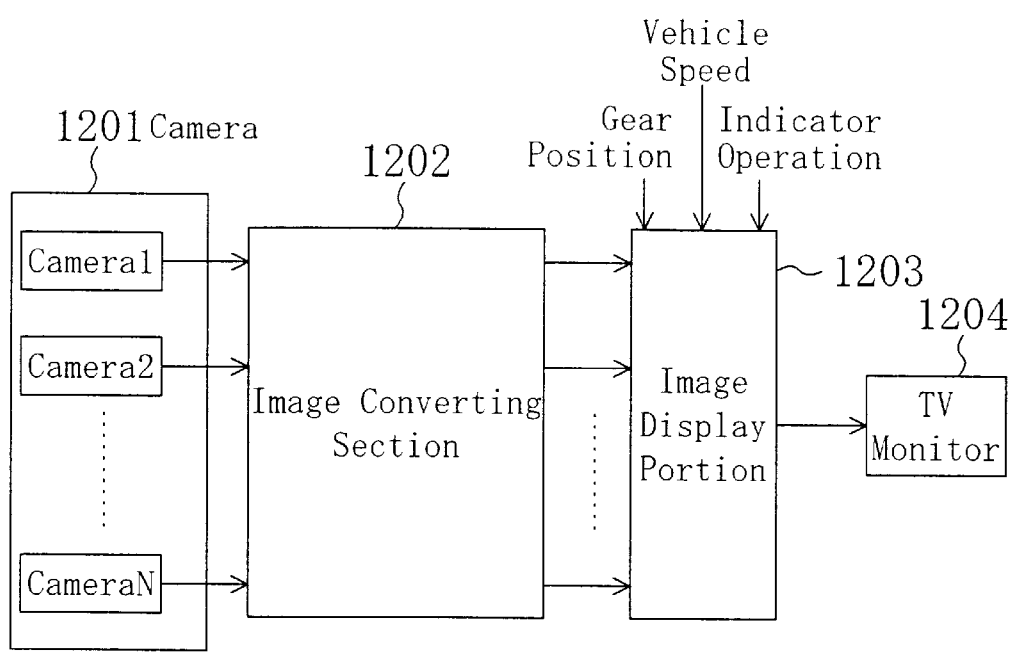
FIG. 23 is a diagram showing the structure of a conventional vehicle monitoring system.

Moreover, variation in the positional relation between the lens and CCD also results in large positional displacement. It is now assumed that a ½-inch CCD (length: 6.47 mm; width: 4.85 mm) and a wide-angle lens having a horizontal angle of view of 111 degrees are used, as shown in FIG. 22C. The focal length f1 is about 3 mm. Provided that the positional relation between the CCD and the lens is shifted in parallel with the CCD plane by du (=0.1 mm) as shown in FIG. 22C, the displaced angle dp of the optical axis is given by the following equation:

$$d\rho = \operatorname{atan}(du/fl)$$
$$= \operatorname{atan}(0.1/3)$$
$$= 1.91°.$$

Therefore, the point on the road surface corresponding to the optical axis is shifted by the distance d2 of about 14 cm.

Thus, displacement of several degrees in orientation of the camera or displacement of about 0.1 mm in the positional relation between the CCD and the lens results in the positional displacement of 10 cm or more on the road surface. Accordingly, regarding the orientation of the camera and the positional relation between the lens and the CCD within the camera, calibration must be conducted with precision on the order equal to or smaller than these values.

As has been described above, according to the present invention, the positional relation between the mobile object and the target apparatus is either fixed to a prescribed relation by the positioning means or obtained by the positional-relation estimating means. Therefore, the mobile object need no longer be positioned with high precision for camera calibration. Accordingly, calibration of the cameras mounted on the mobile object is simplified.

What is claimed is:

1. A calibration system, comprising:
   a mobile object having a camera mounted thereon;
   a target apparatus for calibrating the camera; and
   a positioning means provided to at least one of the mobile object and the target apparatus for fixing a positional relation between the mobile object and the target apparatus to a prescribed relation;
   wherein the positioning means has a joint means for physically fixing the target apparatus to the mobile object.

2. A calibration system, comprising:
   a mobile object having a camera mounted thereon;
   a target apparatus for calibrating the camera; and
   a positioning means provided to at least one of the mobile object and the target apparatus for fixing a positional relation between the mobile object and the target apparatus to a prescribed relation;
   wherein the positioning means has a scope means provided to one of the mobile object and the target apparatus for positioning the target apparatus with reference to a target point located on the other.

3. A calibration system, comprising:
   a mobile object having a camera mounted thereon;
   a target apparatus for calibrating the camera; and
   a positioning means provided to at least one of the mobile object and the target apparatus for fixing a positional relation between the mobile object and the target apparatus to a prescribed relation;
   wherein the target apparatus has a feature point capable of emitting light under external control, and the mobile object includes a control means for controlling the light emission of the feature point of the target apparatus.

4. A calibration system, comprising:
   a mobile object having a camera mounted thereon;
   a target apparatus for calibrating the camera; and
   a positional-relation estimating means provided to at least one of the mobile object and the target apparatus for obtaining a positional relation between the mobile object and the target apparatus,
   wherein the positional-relation estimating means has a target data obtaining means for obtaining a first coordinate value in a first coordinate system based on the target apparatus regarding a target point having a known second coordinate value in a second coordinate system based on the mobile object, and
   wherein the positional-relation estimating means obtains the positional relation between the mobile object and the target apparatus on the basis of the first coordinate value obtained by the target data obtaining means and the known second coordinate value.

5. A target apparatus for calibrating a camera mounted on a mobile object, comprising a positioning means for fixing a positional relation between the mobile object and the target apparatus to a prescribed relation.

6. A target apparatus for calibrating a camera mounted on a mobile object, comprising a positional-relation estimating means for obtaining a positional relation between the mobile object and the target apparatus.

7. A method for calibrating a camera mounted on a mobile object, comprising the steps of:
   preparing a target apparatus for calibration around the mobile object;
   obtaining a positional relation between the target apparatus and the mobile object by using a positional-relation estimating means provided to the target apparatus; and
   capturing a feature point of the target apparatus with the camera, wherein
   the camera is calibrated based on Image coordinates of the feature point, real-world coordinates of the feature point based on the target apparatus, and the obtained positional relation between the target apparatus and the mobile object.

* * * * *